United States Patent
Tillery, Jr. et al.

(10) Patent No.: US 11,340,937 B2
(45) Date of Patent: May 24, 2022

(54) SYSTEM AND METHOD OF UTILIZING PLATFORM APPLICATIONS WITH INFORMATION HANDLING SYSTEMS

(71) Applicant: Dell Products L.P., Round Rock, TX (US)

(72) Inventors: Donald Richard Tillery, Jr., Murphy, TX (US); Brijesh Kumar Mishra, Murphy, TX (US); Sai Sivakumar Dhakshinamurthy, Frisco, TX (US); Dongli Wu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/910,928

(22) Filed: Jun. 24, 2020

(65) Prior Publication Data
US 2021/0406063 A1   Dec. 30, 2021

(51) Int. Cl.
*G06F 9/48*   (2006.01)
*H04L 9/32*   (2006.01)
(Continued)

(52) U.S. Cl.
CPC ........ *G06F 9/4843* (2013.01); *G06F 13/1668* (2013.01); *G06F 13/4282* (2013.01); *H04L 9/3236* (2013.01)

(58) Field of Classification Search
CPC .............. G06F 9/4843; G06F 13/1668; G06F 13/4282; G06F 9/4406; G06F 9/544; G06F 9/4411; G06F 9/4403; H04L 9/3236
(Continued)

(56) References Cited

U.S. PATENT DOCUMENTS

| | | | | |
|---|---|---|---|---|
| 5,134,580 A | * | 7/1992 | Bertram | G06F 9/441 713/1 |
| 5,187,792 A | * | 2/1993 | Dayan | G06F 9/24 711/118 |

(Continued)

FOREIGN PATENT DOCUMENTS

WO    2019/113686 A1    6/2019

OTHER PUBLICATIONS

Windows Platform Binary Table (WPBT) by Windows at <http://go.microsoft.com/fwlink/p/?LinkId=234840>, Jul. 9, 2015, 12 pages.

(Continued)

*Primary Examiner* — Paul R. Myers
(74) *Attorney, Agent, or Firm* — Baker Botts L.L.P.

(57) ABSTRACT

In one or more embodiments, one or more systems, one or more methods, and/or one or more methods may: register a subroutine configured to store multiple network resource addresses via a volatile memory medium; for each information handling system (IHS) initialization executable of multiple IHS initialization executables: retrieve, from a non-volatile memory medium, the IHS initialization executable; execute the IHS initialization executable via an environment associated with IHS firmware; call, by the IHS initialization executable, the subroutine; and store, by the subroutine, a network resource address associated with an operating system (OS) executable via command line arguments, where the command line arguments are stored via a data structure in the volatile memory medium; and for each network resource address of the command line arguments: retrieve, based at least on the network resource address, an OS executable associated with the network resource address from another IHS via a network.

20 Claims, 24 Drawing Sheets

(51) Int. Cl.
*G06F 13/42* (2006.01)
*G06F 13/16* (2006.01)

(58) Field of Classification Search
USPC .......................................................... 713/1
See application file for complete search history.

(56) References Cited

U.S. PATENT DOCUMENTS

| | | | | |
|---|---|---|---|---|
| 5,715,456 | A * | 2/1998 | Bennett | G06F 9/4406 713/2 |
| 6,216,224 | B1 * | 4/2001 | Klein | G06F 9/4401 709/222 |
| 6,330,667 | B1 * | 12/2001 | Klein | G06F 9/4403 709/222 |
| 7,937,701 | B2 | 5/2011 | Kinney et al. | |
| 8,316,248 | B2 * | 11/2012 | Yokota | G06F 1/3209 713/310 |
| 8,418,226 | B2 | 4/2013 | Gardner | |
| 8,868,933 | B2 | 10/2014 | Gardner | |
| 9,465,958 | B2 | 10/2016 | Gardner | |
| 9,465,959 | B2 | 10/2016 | Gardner | |
| 2001/0039612 | A1 * | 11/2001 | Lee | G06F 9/4406 713/2 |
| 2009/0063810 | A1 * | 3/2009 | Garcia-Tobin | G06F 12/0638 711/209 |
| 2014/0101535 | A1 | 4/2014 | Kim et al. | |
| 2019/0339991 | A1 | 11/2019 | Reddy et al. | |
| 2021/0240489 | A1 * | 8/2021 | Xie | G06F 21/572 |

OTHER PUBLICATIONS

Vincent Zimmer et al., "Beyond BIOS Developing with the Unified Extensible Firmware Interface, $2^{nd}$ Edition", Intel Press 427 pages, Nov. 2010.

Sarathy Jayakumar's "ACPI Based "Platform Communication Channel" (PCC) Mechanism", Intel White Paper, 15 pages, Oct. 2015.

"Advanced Configuration and Power Interface Specification Version 6.0" Unified EFI, Inc., Apr. 2015, 1056 pages.

"Advanced Configuration and Power Interface Specification Version 6.2" Unified EFI, Inc., May 2017, 1192 pages.

* cited by examiner

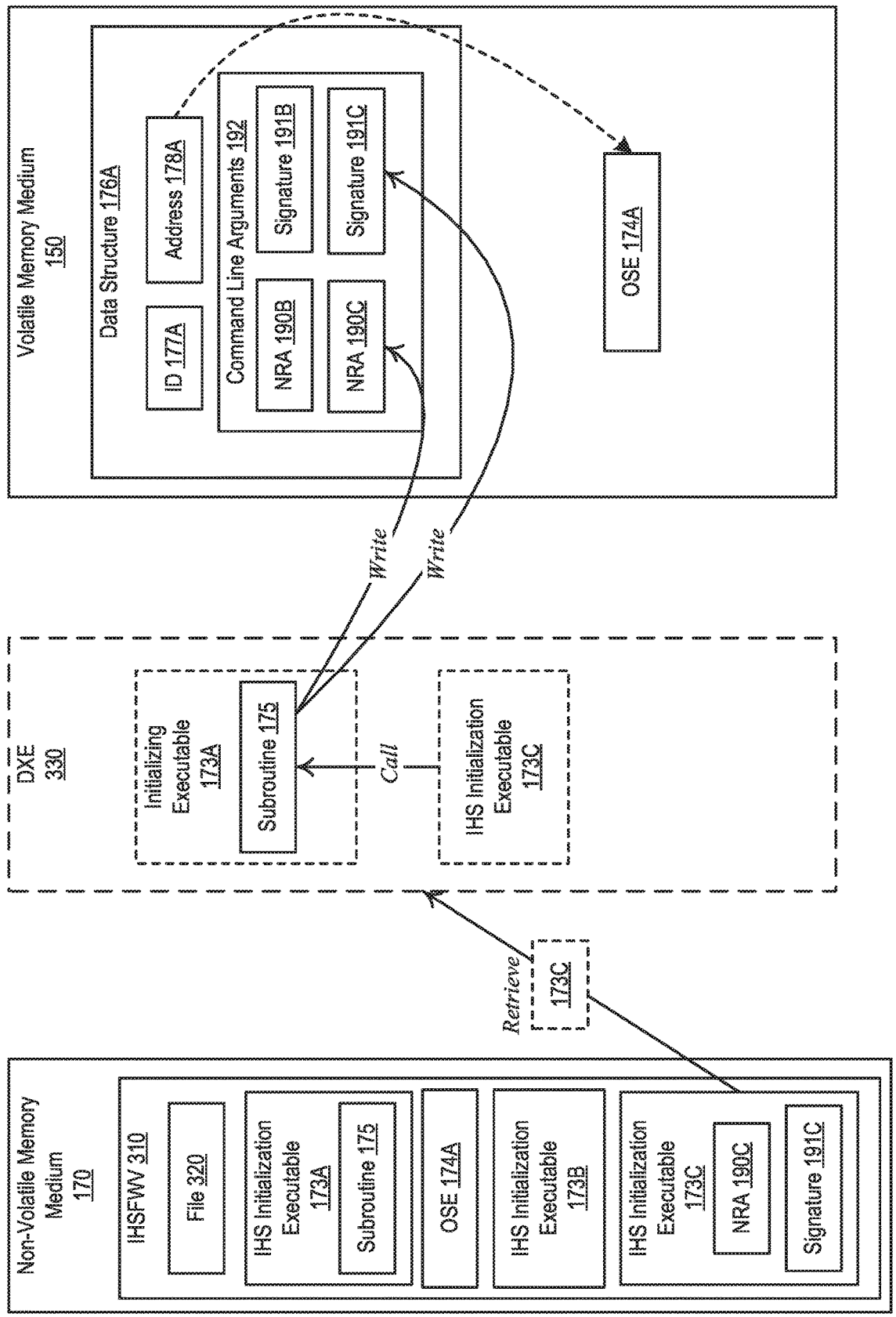

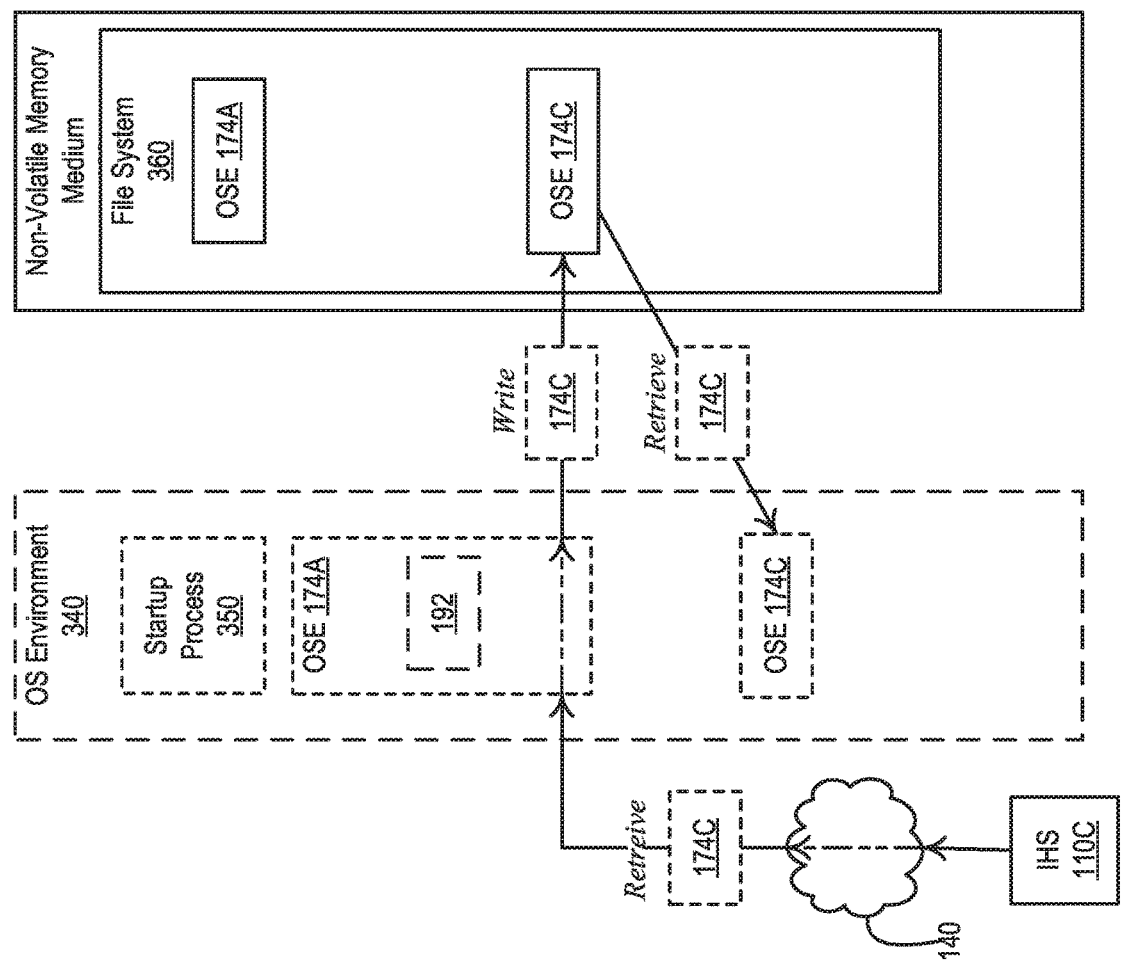

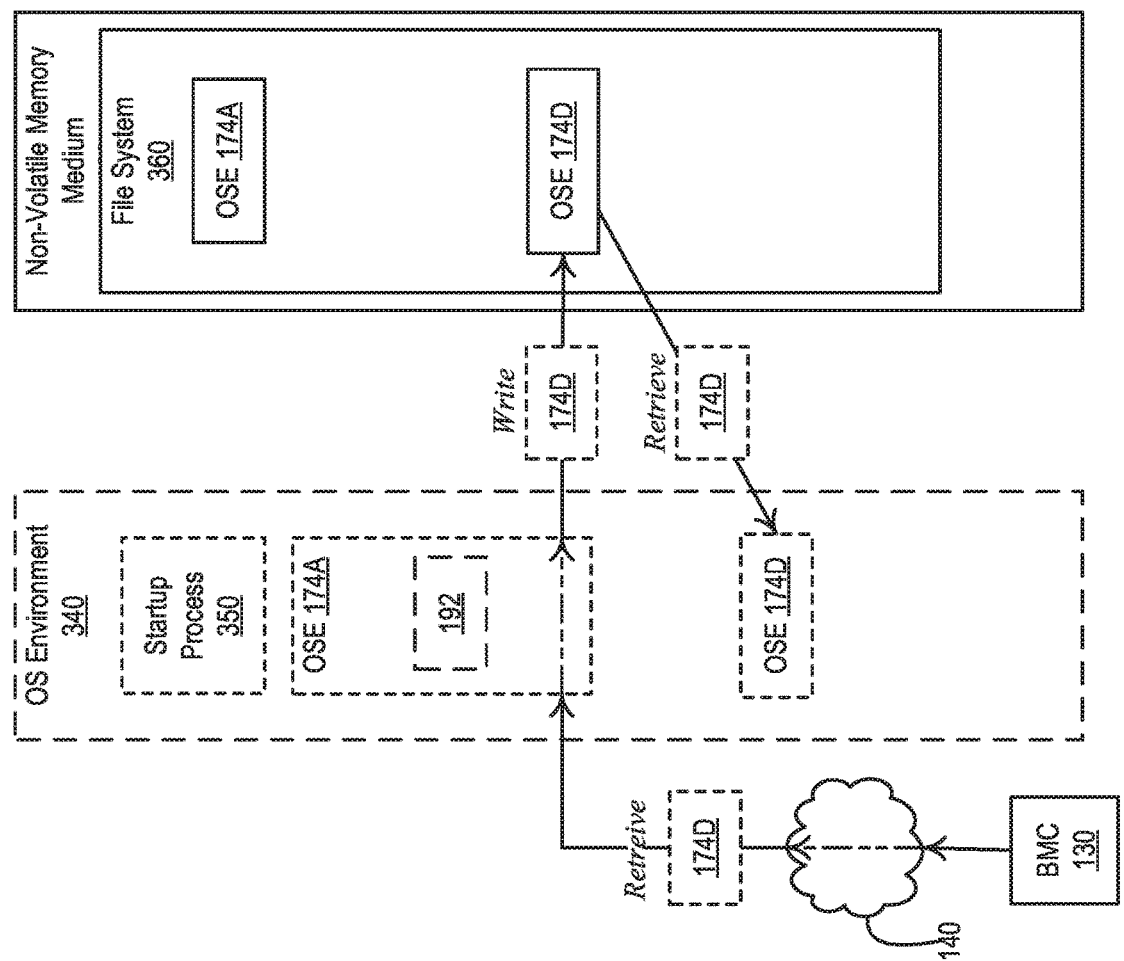

SYSTEM AND METHOD OF UTILIZING PLATFORM APPLICATIONS WITH INFORMATION HANDLING SYSTEMS

BACKGROUND

Field of the Disclosure

This disclosure relates generally to information handling systems and more particularly to utilizing platform applications with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute, by at least one processor of an information handling system (IHS), at least a portion of IHS firmware (IHSFW) from a first non-volatile memory medium of the IHS; may retrieve, from the first non-volatile memory medium, a first IHS initialization executable of a first IHS initialization executable associated with a first operating system (OS) executable; may execute, by the at least one processor, the first IHS initialization executable via an environment associated with the IHSFW; may register, by the first IHS initialization executable, a subroutine configured to store multiple network resource addresses respectively associated with multiple OS executables; may copy, by the first IHS initialization executable, the first OS executable from the first non-volatile memory medium to a volatile memory medium of the IHS; may execute, by the at least one processor, the first OS executable via an OS environment; for each IHS initialization executable of multiple IHS initialization executables: may retrieve the IHS initialization executable from the first non-volatile memory medium; may execute, by the at least one processor, the IHS initialization executable via the environment associated with the IHSFW; may call, by the IHS initialization executable, the subroutine; and may store, by the subroutine, a network resource address of the multiple network resource addresses associated with an OS executable of the multiple OS executables via command line arguments, wherein the command line arguments are stored via a data structure in the volatile memory medium; may retrieve, by the first OS executable, the command line arguments from the volatile memory medium; may start, by the first OS executable, a background executable; and for each network resource address of the command line arguments: may retrieve, by the background executable, the OS executable associated with the network resource address from another IHS based at least on the network resource address and via a network coupled to the IHS.

In one or more embodiments, the one or more systems, the one or more methods, and/or the one or more processes, for each IHS initialization executable of the multiple IHS initialization executables: may further store, by the subroutine, a signature associated with the OS executable via the command line arguments; and, for each network resource address of the command line arguments: may further determine a first hash value of the OS executable; may further decrypt the signature associated with the network resource address to obtain a second hash value; may further determine if the first hash value matches the second hash value; if the first hash matches the second hash value, may further execute the OS executable via the OS environment; and if the first hash does not match the second hash value, may further provide information that indicates that the first hash does not match the second hash value.

In one or more embodiments, the environment associated with the IHSFW environment may include a driver execution environment (DXE). For example, a first DXE driver may include the first IHS initialization executable. For instance, multiple DXE drivers may respectively include the multiple IHS initialization executables. In one or more embodiments, the IHS may include a baseboard management controller. For example, the other IHS may include a baseboard management controller of the IHS. In one or more embodiments, the first non-volatile memory medium may include a serial interface flash memory device. In one or more embodiments, the data structure may include a table. For example, the table may be compliant with an Advanced Configuration and Power Interface (ACPI) table. In one or more embodiments, the multiple network resource addresses may include respective multiple Uniform Resource Locators (URLs).

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 3I illustrates an example of providing information associated with a third operating system executable to command line arguments, according to one or more embodiments;

FIG. 3K illustrates a second example of providing a third operating system executable to a non-volatile memory medium, according to one or more embodiments;

FIG. 3L illustrates a second example of providing a fourth operating system executable to a non-volatile memory medium, according to one or more embodiments;

FIG. 3O illustrates another example of providing a fourth operating system executable to a non-volatile memory medium, according to one or more embodiments;

DETAILED DESCRIPTION

Figure 1A:
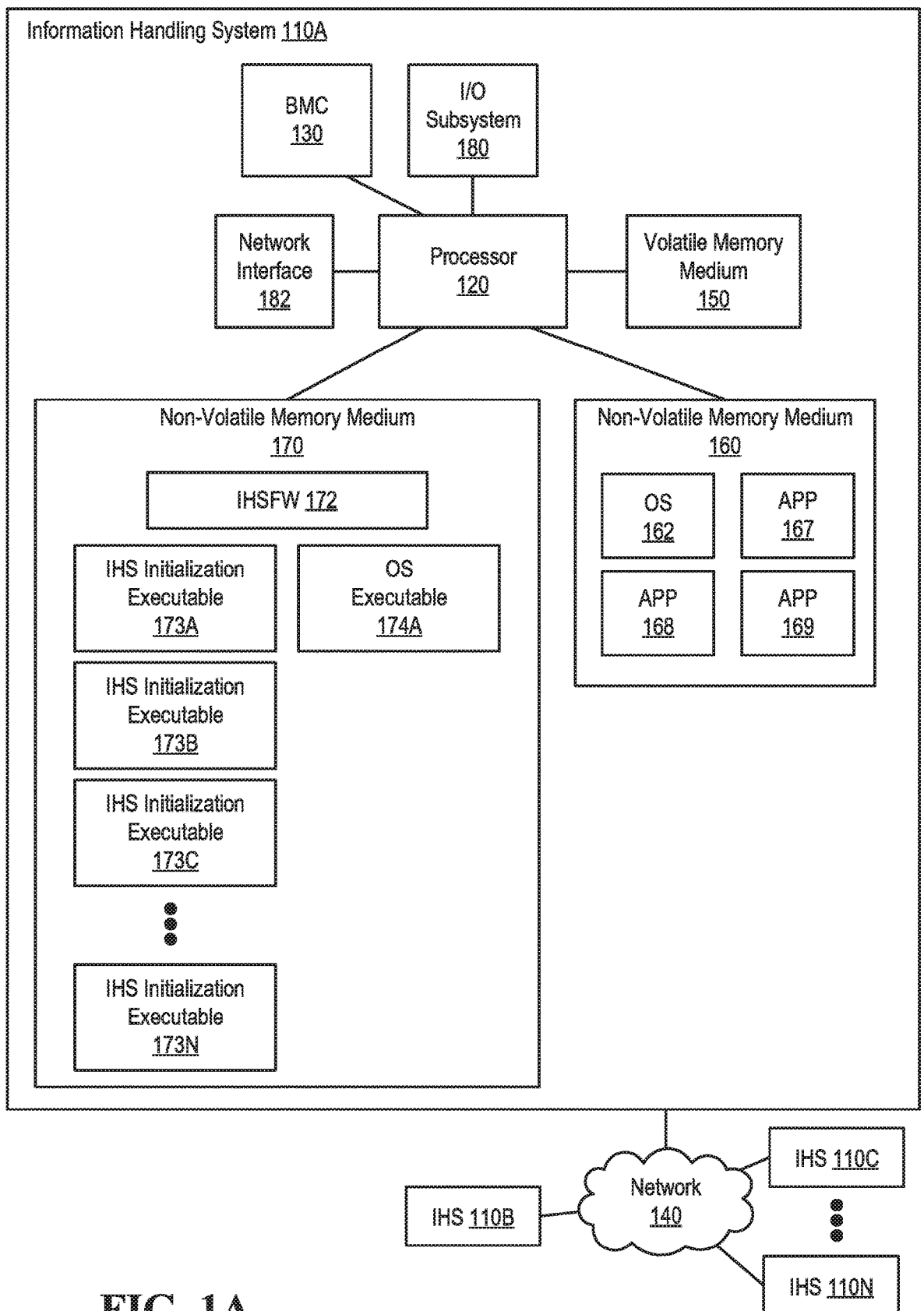
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an operating system (OS) may provide a capability, in a new installation or in a reinstallation, which works in conjunction with information handling system firmware (IHSFW) to execute an IHSFW-based platform application. For example, the platform application may enable an information handling system (IHS) manufacturer with an option to install an application on an IHS where existing applications of the OS may not be adequate. For instance, the platform application may be configured to accommodate specific characteristics of an IHS, such as specific characteristic of a hardware component of the IHS. In one or more embodiments, the platform application may be installed after the OS is installed or after the OS is reinstalled. In one example, in this fashion, the platform application may have continuity across multiple OS installations on same or different non-volatile memory media (e.g., solid state drive(s), hard drive(s), etc.). In a second example, in this fashion, the platform application may endure across multiple OS installations on same or different non-volatile memory media (e.g., solid state drive(s), hard drive(s), etc.). In another example, in this fashion, the platform application may be installed or reinstalled across multiple OS installations on same or different non-volatile memory media (e.g., solid state drive(s), hard drive(s), etc.).

In one or more embodiments, multiple platform applications may be installed via a platform application controller. For example, the OS may instruct a processor of the IHS to execute the platform application controller. For instance, the platform application controller may include one or more structures and/or one or more functionalities of a session manager. In one or more embodiments, the session manager may instruct the processor to execute multiple additional platform applications.

In one or more embodiments, a first data structure may be populated with information associated with a platform application. For example, the first data structure may include a first table. In one instance, the first table may be compliant with an Advanced Configuration and Power Interface (ACPI) table. In another instance, the first table may be or include an ACPI table. In one or more embodiments, the first data structure may be utilized to communicate information, associated with the platform application, between the IHSFW and the OS.

In one or more embodiments, a second data structure may be populated with information associated with one or more additional platform applications. For example, the second data structure may include a second table. In one instance, the second table may be compliant with an ACPI table. In another instance, the second table may be or include an ACPI table. In one or more embodiments, the second data structure may be utilized to communicate information, associated with the one or more additional platform applications, between the OS and the IHSFW.

In one or more embodiments, the one or more additional platform applications may enable one or more options to install the one or more additional applications on the IHS where existing applications of the OS may not be adequate. For example, the one or more additional platform applications may provide one or more advantages over a single platform application. In one instance, utilizing the one or more additional platform applications may provide a granular control over enabling and/or disabling the one or more additional applications. In another instance, utilizing the one or more additional platform applications may provide one or more options for one or more third-party vendors to provide their respective one or more platform applications without having to incorporate such functionalities into a single platform application.

In one or more embodiments, during a launch of the OS, a session manager may load a platform controller and instruct the processor to execute the platform controller. In one or more embodiments, the platform controller may perform a process that loaded and executed the platform controller to load and instruct the processor to execute the one or more additional platform applications. For example, the platform controller may access the second data structure and retrieve information associated with the one or more additional platform applications. In one or more embodiments, the one or more additional platform applications may be stored via a non-volatile memory medium of the IHS. For example, the non-volatile memory medium of the IHS may include a hard disk drive, a solid state drive, etc. For instance, the one or more additional platform applications may be stored via a non-volatile memory medium of the IHS where the OS is stored.

In one or more embodiments, the one or more additional IHS initialization executables may include respective one or more network resource addresses. In one example, a network resource address may include a network address. In one instance, a network address may include Internet protocol (IP) address. In a second instance, a network address may include a media access control (MAC) address. In another instance, a network address may include a logical network address (e.g., www.dell.com, www.example.com, etc.). An IP address may be associated with the logical network address and/or may be determined from the logical network address. As an example, an IP address may be determined from the logical network address via a domain name system (DNS). In one or more embodiments, the one or more network resource addresses may include respective one or more Uniform Resource Identifiers (URIs). For example, a Uniform Resource Identifier (URI) may include a Uniform Resource Locator (URL). For instance, the one or more additional IHS initialization executables may include respective one or more Uniform Resource Locators (URLs).

In one or more embodiments, an IHS initialization executable may store a URL, associated with the IHS initialization executable, via a data structure. For example, the IHS initialization executable may call a subroutine that may store the URL via the data structure. In one or more embodiments, an IHS initialization executable may store a URL, associated with the IHS initialization executable, via command line arguments. For example, the IHS initialization executable may call a subroutine that may store the URL via the command line arguments.

In one or more embodiments, a first IHS initialization executable may provide a first OS executable to a volatile memory medium of an IHS. An OS, executed by the IHS, may copy the first OS executable to a non-volatile memory medium of the IHS. A processor of the IHS may execute the first OS executable. For example, the first OS executable may be executed via an OS environment.

In one or more embodiments, the first OS executable may retrieve one or more URLs from a volatile memory medium of the IHS. In one example, the first OS executable may retrieve one or more URLs from a data structure stored by the volatile memory medium. In a second example, the first OS executable may retrieve one or more URLs from command line arguments stored by the volatile memory medium. In another example, a background executable may receive the one or more URLs via command line arguments. In one instance, the background executable may include a MICROSOFT® WINDOWS® service. In another instance, the background executable may include a daemon. For instance, the daemon may execute via a UNIX® OS or a Unix-like OS. The first OS executable or the background executable may retrieve one or more additional OS executables utilizing the one or more URLs. For example, the first OS executable or the background executable may download the one or more additional OS executables utilizing the one or more URLs. The one or more additional OS executables may be stored via the non-volatile memory medium of the IHS. In one or more embodiments, while a background executable is being executed by a processor, the background executable may be called and/or considered to be a background process.

In one or more embodiments, retrieving the one or more additional OS executables utilizing the one or more URLs may provide one or more advantages over storing the one or more additional OS executables via a non-volatile memory medium of the IHS. For example, the non-volatile memory medium may store IHSFW. An amount of space of the non-volatile memory medium may be finite. In one instance, after the non-volatile memory medium stores the IHSFW, an amount of space of the non-volatile memory medium remaining for storing the one or more additional OS executables may be limited. In another instance, storing the one or more additional OS executables via the non-volatile memory medium may limit an amount of space for the IHSFW.

Turning now to FIG. 1A, an example of an information handling system is illustrated, according to one or more embodiments. An IHS 110A may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110A may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110A may include or have a form factor of that of or similar to one or more of a laptop, a notebook, a telephone, a tablet, and a PDA, among others. For example, a portable IHS 110A may be readily carried and/or transported by a user (e.g., a person). In one or more embodiments, components of IHS 110A may include one or more storage devices, one or more communications ports for communicating with external devices as well as various input and output (I/O) devices, such as a keyboard, a mouse, and a video display, among others. In one or more embodiments, IHS 110A may include one or more buses operable to transmit communication between or among two or more hardware components. In one example, a bus of IHS 110A may include one or more of a memory bus, a peripheral bus, and a local bus, among others. In another example, a bus of IHS 110A may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110A may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110A may include a processor 120, a baseboard management controller (BMC) 130, a volatile memory medium 150, non-volatile memory media 160 and 170, an I/O subsystem 180, and a network interface 182. As illustrated, BMC 130, volatile memory medium 150, non-volatile memory media 160 and 170, PO subsystem 180, and network interface 182 may be communicatively coupled to processor 120.

In one or more embodiments, one or more of BMC 130, volatile memory medium 150, non-volatile memory media 160 and 170, I/O subsystem 180, and network interface 182 may be communicatively coupled to processor 120 via one or more buses, one or more switches, and/or one or more root complexes, among others. In one example, one or more of BMC 130, volatile memory medium 150, non-volatile memory media 160 and 170, PO subsystem 180, and network interface 182 may be communicatively coupled to processor 120 via one or more PCI-Express (PCIe) root complexes. In another example, one or more of BMC 130, I/O subsystem 180 and a network interface 182 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 182 may be utilized in communicating with one or more networks and/or one or more other information handling systems. In one example, network interface 182 may enable IHS 110A to communicate via a network utilizing a suitable transmission protocol and/or standard. In a second example, network interface 182 may be coupled to a wired network. In a third example, network interface 182 may be coupled to an optical network. In another example, network interface 182 may be coupled to a wireless network.

In one or more embodiments, network interface 182 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 182 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110A). In another example, processor 120 may interpret and/or execute program instructions and/or process data stored remotely (e.g., via a network storage resource).

In one or more embodiments, I/O subsystem 180 may represent a variety of communication interfaces, graphics interfaces, video interfaces, user input interfaces, and/or peripheral interfaces, among others. For example, I/O subsystem 180 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 167-169. In one or more embodiments, one or more of OS 162 and APPs 167-169 may include processor instructions executable by processor 120. In one example, processor 120 may execute processor instructions of one or more of OS 162 and APPs 167-169 via non-volatile memory medium 160. In another example, one or more portions of the processor instructions of the one or more of OS 162 and APPs 167-169 may be transferred to volatile memory medium 150, and processor 120 may execute the one or more portions of the processor instructions of the one or more of OS 162 and APPs 167-169 via volatile memory medium 150.

In one or more embodiments, OS 162 may be or include an UNIX® operating system. In one or more embodiments, OS 162 may be or include an Unix-like operating system. For instance, the Unix-like operating system may be or include LINUX®, FREEBSD®, NETBSD®, MACOS®, OpenBSD, Minix, Xinu, or Darwin, among others. In another example, OS 162 may be or include a portable operating system interface (POSIX) compliant operating system. In one or more embodiments, OS 162 may be or include a MICROSOFT® WINDOWS® operating system.

As illustrated, non-volatile memory medium 170 may include IHSFW 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. As shown, non-volatile memory medium 170 may include IHS initialization executables 173A-173N. In one or more embodiments, IHS initialization executables 173A-173N may be executable in an environment of IHSFW 172. For example, IHS initialization executables 173A-173N may be executable in a Driver Execution Environment (DXE) of IHSFW 172.

In one or more embodiments, an IHS initialization executable 173 may be an initializing executable. For example, an IHS initialization executable 173 may at least a portion of IHS 110A. For instance, IHSFW 172 may discover and execute an IHS initialization executable 173 to initialize at least a portion of IHS 110A. In one or more embodiments, an IHS initialization executable 173 may be associated with a portable execution/common object file format (PE/COFF). For example, IHSFW 172 may include a PE/COFF loader to load and execute an IHS initialization executable 173. In one or more embodiments, an IHS initialization executable 173 may be a DXE driver. For example, IHSFW 172 may include a DXE dispatcher that may discover and execute an IHS initialization executable 173 to initialize at least a portion of IHS 110A.

As illustrated, non-volatile memory medium 170 may include OS executable 174A. In one or more embodiments, OS executable 174A may be executable in an environment of OS 162. For example, an OS executables 174, described herein, may be a platform application.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110A) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110A may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

As illustrated, IHS 110A may be coupled to a network 140. Although not specifically illustrated, network interface 182 may be coupled to network 140, for example. In one or more embodiments, BMC 130 may be coupled to network 140. In one or more embodiments, network 140 may include a wired network, a wireless network, an optical network, or a combination of the foregoing, among others. For example, network 140 may include and/or be coupled to various types of communications networks. For instance, network 140 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. As shown, information handling systems (IHSs) 100B-110N may be coupled to network 140. In one or more embodiments, IHS 110A may be communicatively coupled to one or more of IHSs 100B-110N via network 140. In one or more embodiments, IHS 110A may be communicatively coupled to BMC 130 via network 140.

Figure 1B:
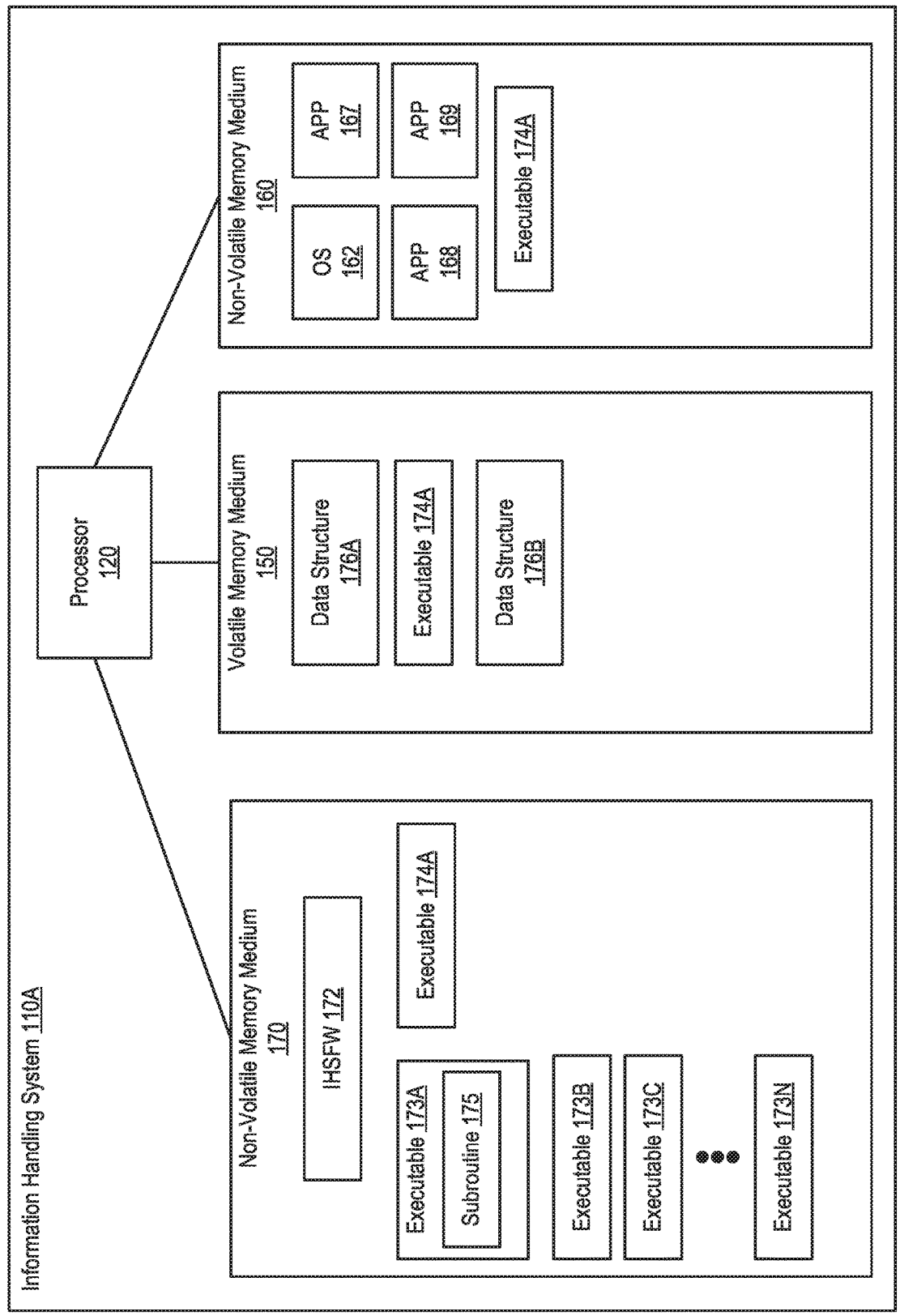
FIG. 1B illustrates another example of an information handling system, according to one or more embodiments.

Turning now to FIG. 1B, another example of an information handling system is illustrated, according to one or more embodiments. In one or more embodiments, IHS initialization executable 173A may be executed. For example, IHS initialization executable 173A may be executed via at least a portion of IHSFW 172. For instance, the at least the portion of IHSFW 172 may determine that non-volatile memory medium 170 includes IHS initialization executable 173A and may instruct processor 120 to execute IHS initialization executable 173A. In one or more embodiments, IHSFW 172 may include and/or may provide an environment. For example, IHSFW 172 may include and/or may provide a DXE. In one or more embodiments, an executable 173 may be a DXE driver. For example, the DXE driver may be executed in a DXE. For instance, processor 120 may execute the DXE driver via the DXE and/or may execute the DXE driver within the DXE. In one or more embodiments, a DXE driver may typically be associated with a hardware component of IHS 110A. For example, the DXE driver may enable IHSFW 172 to communicate with the hardware component. In one or more embodiments, a DXE driver may not be associated with a hardware component of IHS 110A. For example, an IHS initialization executable 173 may be a DXE driver but may not be associated with a hardware component of IHS 110A. For instance, an executable 173 may permit instructions of processor 120 to execute via the DXE.

As shown, IHS initialization executable 173A may include a subroutine 175. In one or more embodiments, subroutine 175 may include instructions, executable by processor 120, to implement at least a portion of one or more systems, at least a portion of one or more flowcharts, at least a portion of one or more methods, and/or at least a portion of one or more processes described herein. For example, processor 120 may execute processor instructions of subroutine 175 in implementing at least a portion of one or more systems, at least a portion of one or more flowcharts, at least a portion of one or more methods, and/or at least a portion of one or more processes described herein.

In one or more embodiments, subroutine 175 may be registered with at least a portion of IHSFW 172. For example, executing IHS initialization executable 173A may register subroutine 175 with at least a portion of IHSFW 172. In one or more embodiments, one or more of IHS initialization 173B-173N may call subroutine 175. For example, the one or more of IHS initialization executables 173B-173N may call subroutine 175 after subroutine 175 is registered. For instance, the one or more of IHS initialization executables 173B-173N may instruct processor 120 to execute subroutine 175. In one or more embodiments, a data structure 176A may be created in volatile memory medium 150. For example, executing IHS initialization executable 173A may create data structure 176A in volatile memory medium 150. In one or more embodiments, data structure 176A may be compliant with an ACPI table. In one or more embodiments, data structure 176A may include an ACPI table.

In one or more embodiments, OS executable 174A may be copied from non-volatile memory medium 170 to volatile memory medium 150. For example, IHS initialization executable 173A may copy OS executable 174A from non-volatile memory medium 170 to volatile memory medium 150. In one instance, copying OS executable 174A from non-volatile memory medium 170 to volatile memory medium 150 may include retrieving OS executable 174A from non-volatile memory medium 170. In another instance, copying OS executable 174A from non-volatile memory medium 170 to volatile memory medium 150 may include writing executable 174A to volatile memory medium 150.

In one or more embodiments, an identifier may be associated with OS executable 174A. For example, the identifier associated with OS executable 174A may include a globally unique identifier (GUID). In one or more embodiments, the GUID may include a number. For example, the GUID may include a 128-bit number. In one or more embodiments, when generated via one or more methods, globally unique identifiers (GUIDs) may be unique for practical purposes. For example, the uniqueness of GUIDs may not depend on a central registration authority or coordination between parties generating the GUIDs. Although a probability that a GUID will be duplicated may not be zero, the probability that a GUID will be duplicated is close enough to zero to be negligible, according to one or more embodiments. In one or more embodiments, a GUID may be or include a universally unique identifier (UUID).

Figure 1D:
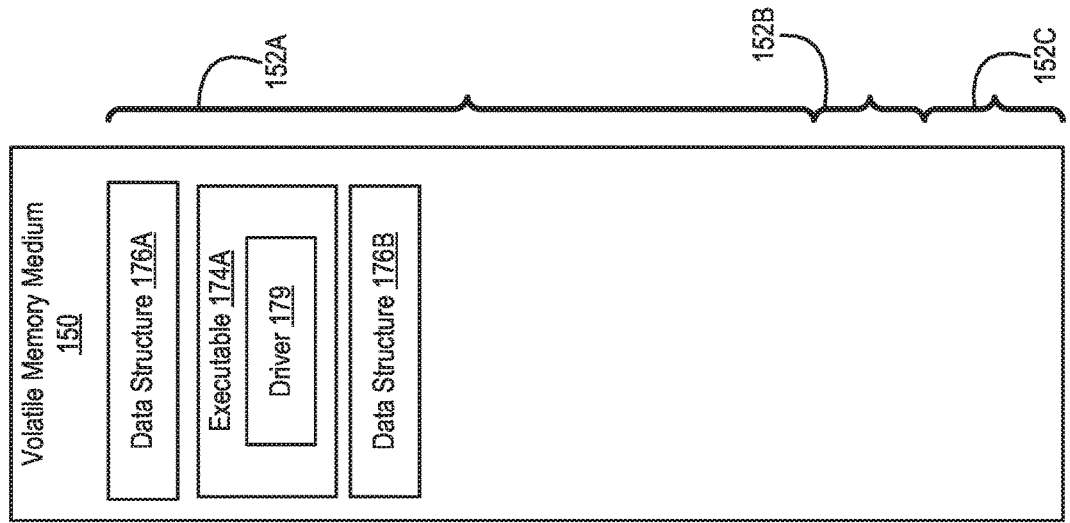
FIG. 1D illustrates examples of portions of a memory medium, according to one or more embodiments.
Figure 1C:
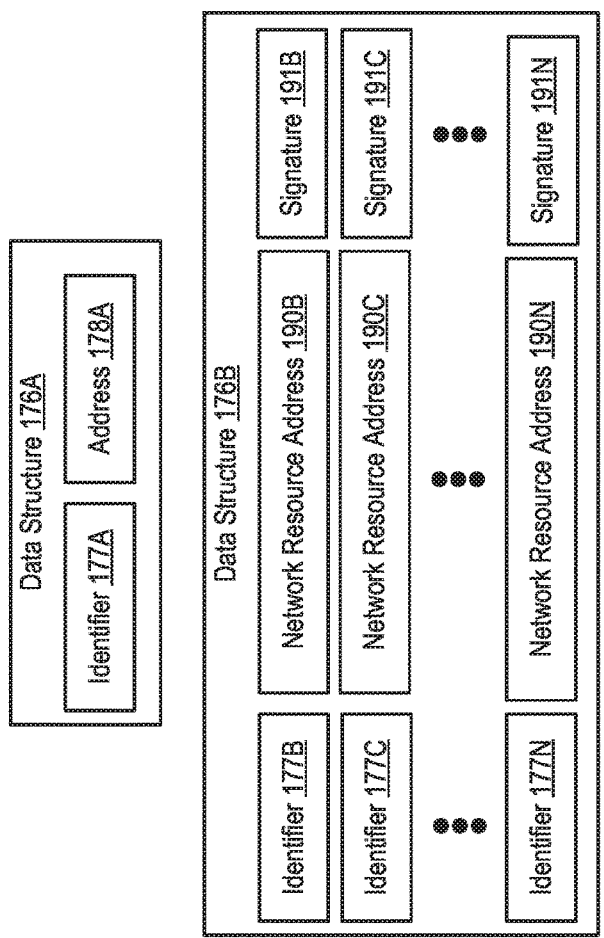
FIG. 1C illustrates examples of a data structure that stores an identifier associated with an address of a volatile memory medium, which is associated with an executable, and a data structure that stores identifiers respectively associated with network resource addresses, according to one or more embodiments.

In one or more embodiments, data structure 176A may store the identifier associated with OS executable 174A. For example, as illustrated in FIG. 1C, data structure 176A may store an identifier 177A associated with OS executable 174A. In one or more embodiments, data structure 176A may store an address of volatile memory medium 150 associated with OS executable 174A. For example, as illustrated in FIG. 1C, data structure 176A may store an address 178A associated with OS executable 174A. In one instance, address 178A of volatile memory medium 150 may be a real address of volatile memory medium 150. In another instance, address 178A of volatile memory medium 150 may be a virtual address associated with a real address of volatile memory medium 150. In one or more embodiments, identifier 177A may be utilized to access address 178A of volatile memory medium 150. For example, data structure 176A may match identifier 177A with address 178A of volatile memory medium 150.

Referring back to FIG. 1B, in one or more embodiments, IHS initialization executable 173B may be executed. For example, IHS initialization executable 173B may be executed via at least a portion of IHSFW 172. For instance, the at least the portion of IHSFW 172 may determine that non-volatile memory medium 170 includes IHS initialization executable 173B and may instruct processor 120 to execute IHS initialization executable 173B.

In one or more embodiments, IHS initialization executable 173B may call subroutine 175. For example, IHS initialization executable 173B may instruct processor 120 to execute subroutine 175. In one or more embodiments, a data structure 176B may be created in volatile memory medium 150. For example, subroutine 175 may create data structure 176B in volatile memory medium 150. In one instance, subroutine 175 may create data structure 176B in volatile memory medium 150 in response to being called by IHS initialization executable 173B. In another instance, subroutine 175 may create data structure 176B in volatile memory medium 150 in response to determining that data structure 176B does not exist in volatile memory medium 150. In one or more embodiments, data structure 176B may be compliant with an ACPI table. In one or more embodiments, data structure 176B may include an ACPI table.

In one or more embodiments, a network resource address 190B may be stored via data structure 176B. For example, subroutine 175 may store network resource address 190B via data structure 176B. In one or more embodiments, a network resource address 190 may be utilizable to obtain an OS executable 174. For example, network resource address 190B may be utilizable to obtain OS executable 174B.

In one or more embodiments, a digital signature 191B may be stored via data structure 176B. For example, subroutine 175 may store digital signature 191B via data structure 176B. In one or more embodiments, a digital signature 191 may be utilizable to determine if an OS executable 174 is valid. For example, digital signature 191B may be utilizable to determine if OS executable 174B is valid.

In one or more embodiments, an identifier may be associated with network resource address 190B. For example, data structure 176B may store the identifier associated with network resource address 190B. For instance, as illustrated in FIG. 1C, data structure 176B may store an identifier 177B associated with network resource address 190B. Subroutine 175 may store identifier 177B associated with network resource address 190B via data structure 176B. In one or more embodiments, an identifier 177 may include a GUID.

In one or more embodiments, identifier 177B associated with network resource address 190B may be utilized to access network resource address 190B. For example, data structure 176B may match an identifier 177B with a network resource address 190B.

In one or more embodiments, one or more methods and/or one or more processes described above with reference to network resource address 190B may be utilized with network resource address 190C-190N. In one or more embodiments, one or more methods and/or one or more processes described above with reference to digital signature 191B may be utilized with digital signatures 191C-191N.

In one or more embodiments, data structure 176B may store identifiers 177C-177N respectively associated with network resource addresses 190C-190N. For example, data structure 176B may match identifiers 177C-177N with respective network resource addresses 190C-190N. For instance, a network resource address 190 may be retrieved via its associated identifier 177. In one or more embodiments, a data structure 176 may include a table. For example, a table entry of a data structure 176 may store an identifier 177 and a network resource address 190.

Referring back to FIG. 1B, in one or more embodiments, OS executable 174A may be copied from volatile memory medium 150 to non-volatile memory medium 160. For example, OS 162 may copy OS executable 174A from volatile memory medium 150 to non-volatile memory medium 160. In one instance, copying OS executable 174A from volatile memory medium 150 to non-volatile memory medium 160 may include retrieving executable 174A from volatile memory medium 150. In another instance, copying OS executable 174A from volatile memory medium 150 to non-volatile memory medium 160 may include writing executable 174A to non-volatile memory medium 160. In one or more embodiments, OS 162 may include a MICROSOFT® WINDOWS® operating system. For example, a MICROSOFT® WINDOWS® operating system session manager may copy OS executable 174A from volatile memory medium 150 to non-volatile memory medium 160. For instance, the MICROSOFT® WINDOWS® operating system session manager may be executed via a startup process of the MICROSOFT® WINDOWS® operating system. In one or more embodiments, OS 162 may launch executable 174A. For example, launching OS executable 174A may include instructing processor 120 to execute executable 174A. For instance, the MICROSOFT® WINDOWS® operating system session manager may instruct processor 120 to execute OS executable 174A. In one or more embodiments, executable 174A may be a platform controller.

In one or more embodiments, OS executable 174A may determine that data structure 176B exists in volatile memory medium 150. For example, OS executable 174A may access data structure 176B. For instance, OS executable 174A may access identifiers stored via data structure 176B. In one or more embodiments, OS executable 174A may utilize an identifier associated with network resource address 190B. For example, OS executable 174A may determine network resource address 190B based at least on identifier 177B associated with network resource address 190B. For instance, OS executable 174A may retrieve network resource address 190B from data structure 176B based at least on identifier 177B.

In one or more embodiments, one or more methods and/or one or more processes described above with reference to network resource address 190B may be utilized with network resource addresses 190C-190N. For example, data structure 176B may store identifiers 177C-177N respectively associated with network resource addresses 190C-190N. For instance, data structure 176B may match the identifiers 177C-177N with respectively associated with network resource addresses 190C-190N.

In one or more embodiments, OS executable 174A may determine a network resource address of network resource addresses 190B-190N via a respective identifier of identifiers 177B-177N. For example, OS executable 174A may retrieve a network resource address of network resource addresses 190B-190N from data structure 176B based at least on a respective identifier of identifiers 177B-177N.

In one or more embodiments, information of data structure 176B may be provided to OS executable 174A via a command line. For example, network resource addresses 190B-190N may be passed on a command line to OS executable 174A. In one instance, a script may pass network resource addresses 190B-190N on the command line to OS executable 174A. In another instance, an executable may pass network resource addresses 190B-190N on a command line to OS executable 174A. In one or more embodiments, data structure 176A may store command line arguments. For example, the command line arguments may store network resource addresses 190B-190N. In one or more embodiments, a network resource address 190 may include a URL. In one example, network resource address 190B may include "http://www.dell.com/osexecutables/modelx/prodBsvc.exe". For instance, command line arguments 192 may store network resource address 190B. In a second example, network resource address 190C may include "http://www.dell.com/osexecutables/modelx/prodCsvc.exe". For instance, command line arguments 192 may store network resource addresses 190B and 190C. In a third example, network resource address 190D may include "http://www.dell.com/osexecutables/modelx/prodDsvc.exe". For instance, the command line arguments may store network resource addresses 190B-190D. In a fourth example, network resource address 190E may include "http://bmc.local/prodDsvc.exe". For instance, the command line arguments may store network resource addresses 190B-190E. In another example, network resource address 190F may include "http://192.168.20.222/prodDsvc.exe". For example, the command line arguments may store network resource addresses 190B-190F.

Although IP address 192.168.20.222 may not be a routable IP address, an IP address of a network resource address may include a routable IP address or a non-routable IP address, according to one or more embodiments. Although IP address 192.168.20.222 may be an IP version four (IPv4) address, an IP address of a network resource address may include any version of IP address, according to one or more embodiments. In one example, a network resource address may include an IPv4 IP address. In another example, a network resource address may include an IP version six (IPv6) IP address.

In one or more embodiments, IHS 110A may retrieve an OS executable 174 associated with a network resource address 190 from another IHS, different from IHS 110A. For example, IHS 110A may retrieve an OS executable 174 associated with a network resource address 190 from an IHS of IHSs 110B-110N. For instance, IHS 110A may retrieve an OS executable 174 associated with a network resource address 190 from an IHS of IHSs 110B-110N via network 140.

In one or more embodiments, IHS 110A may retrieve an OS executable 174 associated with a network resource address 190 from a BMC. For example, IHS 110A may retrieve an OS executable 174 associated with a network resource address 190 from BMC 130. For instance, IHS 110A may retrieve an OS executable 174 associated with a network resource address 190 from BMC 130 via network 140.

In one or more embodiments, multiple network resource addresses may be stored via command line arguments via a separation character. In one example, the separation character may be a space character. For instance, the space character may be associated with an eight-bit number (e.g., decimal value thirty-two (32)). In another example, the separation character may be a '|' character. For instance, the '|' character may be associated with an eight bit number (e.g., decimal value one hundred and twenty-four (124)). Any separation character or any combination of separation characters may be utilized, according to one or more embodiments. In one or more embodiments, a character of a network resource address 190 may be encoded with multiple characters. For example, a network resource address 190 may be URL encoded.

In one or more embodiments, data structure 176B may not be created or may not be utilized. For example, identifiers 177B-177N and respectively associated addresses 178B-178N may be passed via an instruction to run an executable without creating data structure 176B. For instance, identifiers 177B-177N and respectively associated addresses 178B-178N may be passed on a command line to an executable without creating data structure 176B.

In one or more embodiments, volatile memory medium 150 may be associated with multiple portions. Referring to FIG. 1D, for example, volatile memory medium 150 may be associated with multiple memory portions 152A-152C. For instance, a memory portion 152 may be associated with an address range. As an example, memory portions 152A-152C may be respectively associated with different address ranges. Although three memory portions are illustrated in FIG. 1D, any number of memory portions may be utilized, according to one or more embodiments. In one or more embodiments, memory portion 152A may be associated with an address range that is accessible by IHSFW 172 and/or OS 162. For example, memory portion 152A may be associated with an address range that is accessible by a kernel of OS 162. In one instance, the address range associated with memory portion 152A may be accessed in a privileged mode. In another instance, the address range associated with memory portion 152A may not be accessible by a user space application and/or may not be accessible by instructions that are executed via user space.

In one or more embodiments, OS executable 174A may include a driver 179. For example, driver 179 may access memory portion 152A. In one instance, driver 179 may access a kernel of OS 162, which may access memory portion 152A. In another instance, driver 179 may include a loadable kernel module for a kernel of OS 162, which may access memory portion 152A. As an example, memory portion 152A may be accessible by a kernel of OS 162 or a loadable kernel module for the kernel of OS 162. For instance, memory portion 152A may be associated with kernel space, and memory portion 152B may be associated with user space. Driver 179 may enable OS executable 174A to access memory portion 152A (e.g., kernel space). For example, driver 179 may be executed in a privileged mode, which may access memory portion 152A.

In one or more embodiments, OS 162 may instruct processor 120 to execute one or more of executables 174B-174N. In one example, after OS 162 finishes a startup portion of OS 162, OS 162 may instruct processor 120 to execute one or more of OS executables 174B-174N. In another example, after OS 162 finishes the startup portion of OS 162, OS 162 may not instruct processor 120 to execute other one or more of OS executables 174B-174N. For instance, a user, a service, or an application (e.g., an application of APPs 167-169) may launch (e.g., start) the other one or more of OS executables 174B-174N. As an example, the other one or more of OS executables 174B-174N may include one or more applications. For instance, an executable of the other one or more of OS executables 174B-174N may include an application that includes one or more structures and/or one or more functionalities of an application of APPs 167-169.

In one or more embodiments, utilizing one or more systems, one or more methods, and/or one or more processes described herein, one or more of OS executables 174B-174N may have continuity across formatting non-volatile memory medium 160. For example, one or more of OS executables 174B-174N may endure across formatting non-volatile memory medium 160. For instance, one or more of OS executables 174B-174N may be reinstalled after formatting non-volatile memory medium 160. In one or more embodiments, utilizing one or more systems, one or more methods, and/or one or more processes described herein, one or more of OS executables 174B-174N may have continuity across another installation of an operating system. For example, one or more of OS executables 174B-174N may endure across another installation of an operating system. For instance, one or more of executables 174B-174N may be reinstalled after another installation of an operating system.

Figure 2:
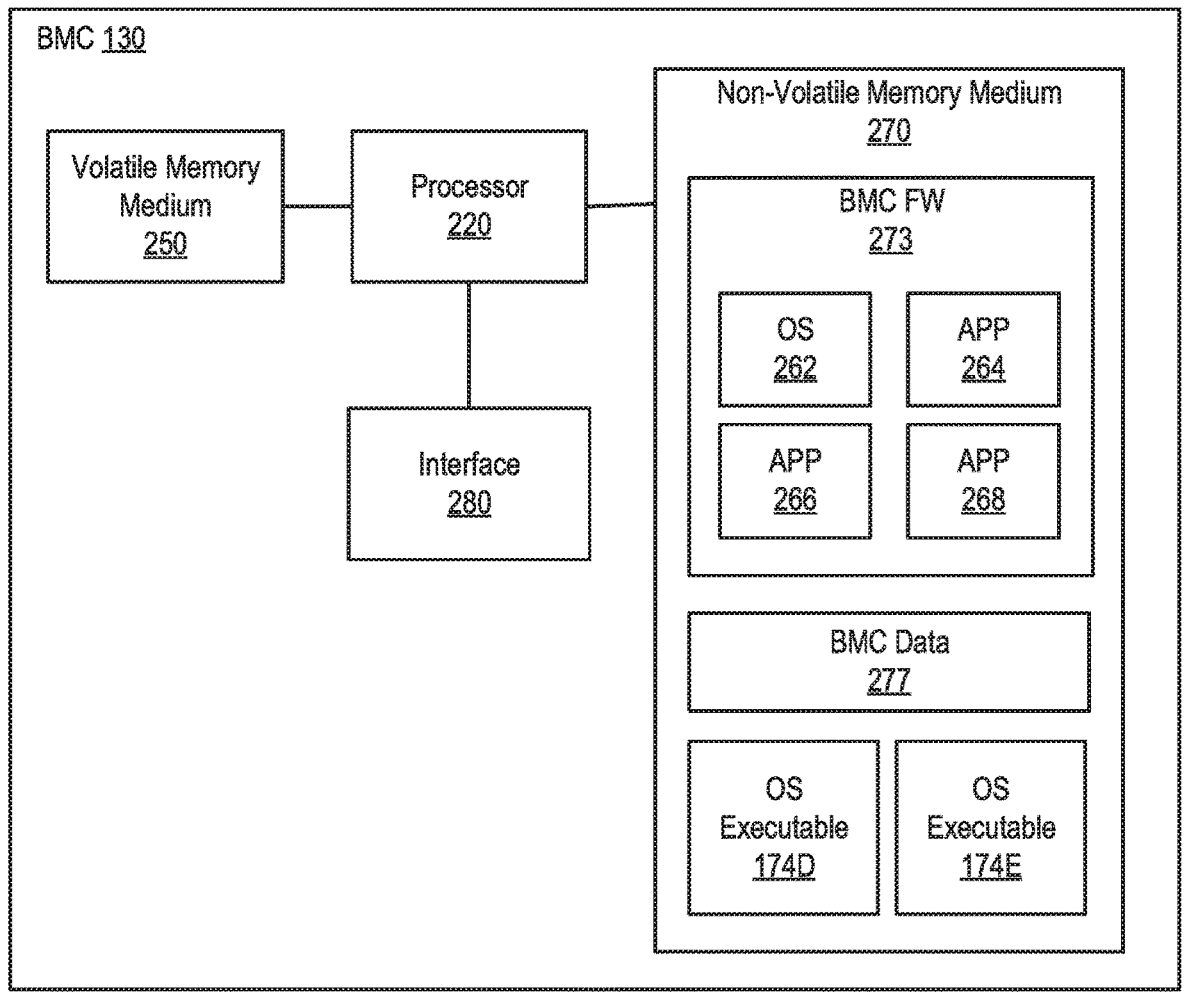
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. As illustrated, non-volatile memory medium 270 may include OS executables 174D and 174E. In one example, APP 264 may include a web server that may receive one or more requests for OS executables 174D and 174E from an IHS 110. In another example, APP 264 may include a web server that may provide one or more OS executables 174D and 174E to an IHS 110.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
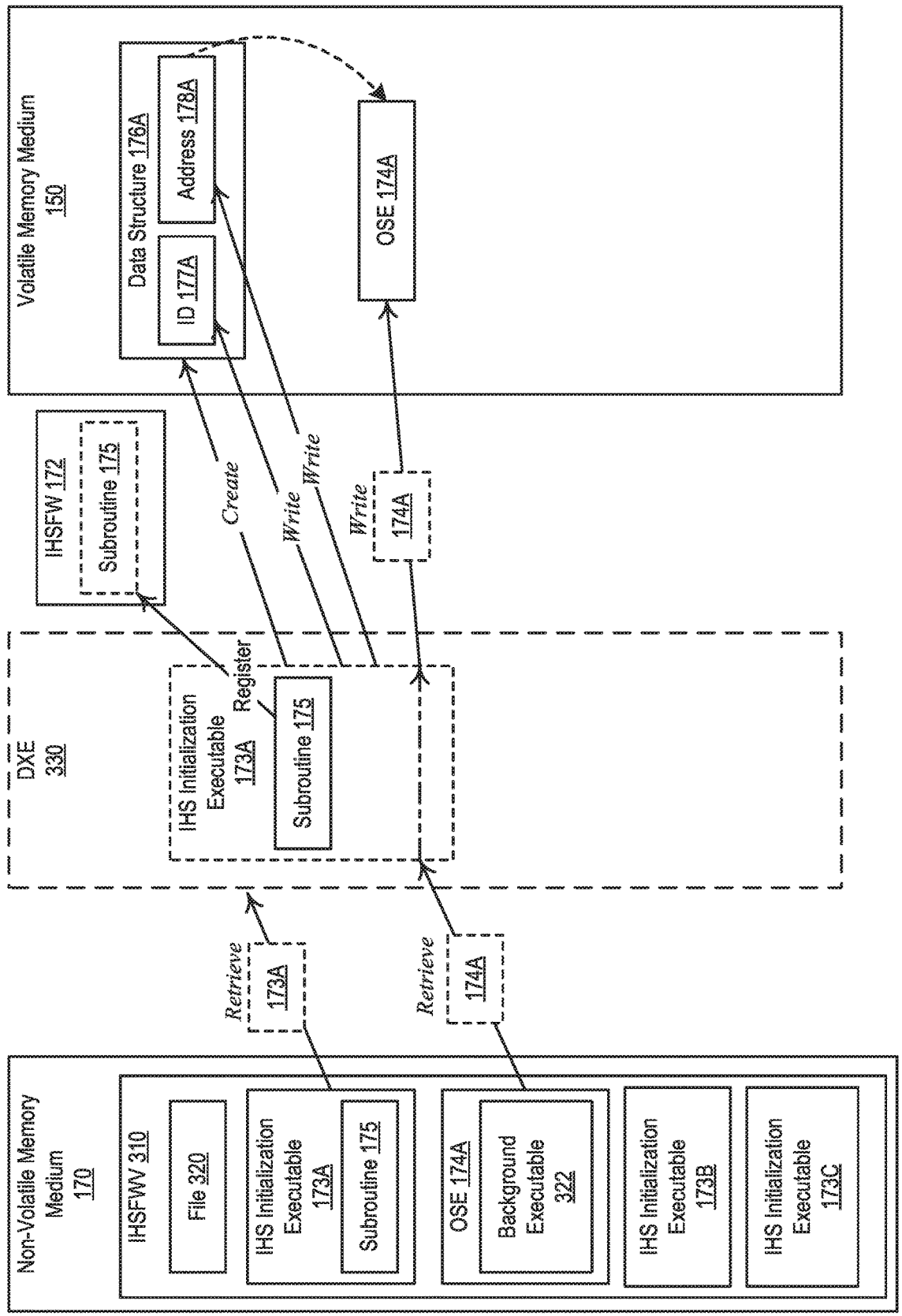
FIG. 3A illustrates an example of providing a first operating system executable to a volatile memory medium, according to one or more embodiments.

Turning now to FIG. 3A, an example of providing a first operating system executable to a volatile memory medium is illustrated, according to one or more embodiments. As shown, non-volatile memory medium 170 may store an IHSFW volume (IHSFWV) 310. As illustrated, IHSFWV 310 may include a file 320. In one or more embodiments, at least a portion of IHSFW 172 may determine an ordering of IHS initialization executables 173A-173C based at least on an ordering indicated by file 320. For example, the at least the portion of IHSFW 172 may includes a DXE 330. For instance, file 320 may include an a priori file. In one or more embodiments, a name of file 320 may include a GUID. For example, DXE 330 may store the name of file 320. For instance, DXE 330 may retrieve file 320 from IHSFWV 310 based at least on the name of file 320. In one or more embodiments, DXE 330 may include a DXE dispatcher. For example, the DXE dispatcher may store the name of file 320. For instance, the DXE dispatcher may retrieve file 320 from IHSFWV 310 based at least on the name of file 320.

As shown, DXE 330 may retrieve IHS initialization executable 173A from non-volatile memory medium 170. For example, DXE 330 may retrieve IHS initialization executable 173A from IHSFWV 310. In one or more embodiments, a first IHS initialization executable/OS executable pair may include IHS initialization executable 173A and OS executable (OSE) 174A. As illustrated, OSE 174A may include a background executable 322. In one or more embodiments, processor 120 may execute IHS initialization executable 173A via DXE 330. For example, IHS initialization executable 173A may include a DXE driver. As illustrated, IHS initialization executable 173A may register a subroutine 175 with IHSFW 172. In one or more embodiments, one or more of IHS initialization executables 173B-173N may call subroutine 175.

In one or more embodiments, background executable 322 may include a MICROSOFT® WINDOWS® service. In one example, OS executable 174A may instruct a MICROSOFT® WINDOWS® service manager to start and/or execute background executable 322. For instance, OS executable 174A may install background executable 322 in a service manager for MICROSOFT® WINDOWS®. In another example, OS executable 174A may start background executable 322. For instance, OS executable 174A may instruct processor 120 to execute background executable 322. After MICROSOFT® WINDOWS® boots again, the service manager for MICROSOFT® WINDOWS® may start background executable 322, according to one or more embodiments. For example, the service manager for MICROSOFT® WINDOWS® may instruct processor 120 to execute background executable 322.

In one or more embodiments, background executable 322 may include a daemon. For example, the daemon may execute via a UNIX® OS or a Unix-like OS. As an example, OS executable 174A may instruct a launchd to start and/or execute background executable 322. For instance, OS 162 may include a MACOS®. As another example, OS executable 174A may instruct a systemd to start and/or execute background executable 322. For instance, OS 162 may include a LINUX® OS.

As shown, OS executable 174A may be retrieved from non-volatile memory medium 170. For example, IHS initialization executable 173A may retrieve OS executable 174A from non-volatile memory medium 170. For instance, OS executable 174A may be retrieved from IHSFWV 310. As illustrated, IHS initialization executable 173A may write OS executable 174A to volatile memory medium 150. For example, IHS initialization executable 173A may write OS executable 174A to volatile memory medium 150 at an address 178A associated with volatile memory medium 150. As shown, IHS initialization executable 173A may create data structure 176A in volatile memory medium 150. In one or more embodiments, data structure 176A may be compliant with an ACPI table. As an example, data structure 176A may include an ACPI table.

As illustrated, IHS initialization executable 173A may write identification (ID) 177A associated with OS executable 174A to data structure 176A. For example, IHS initialization executable 173A may store, via data structure 176A, ID 177A associated with OS executable 174A. As shown, IHS initialization executable 173A may write address 178A associated with OS executable 174A to data structure 176A. For example, IHS initialization executable 173A may store, via data structure 176A, address 178A associated with OS executable 174A. In one or more embodiments, address 178A may be an address of memory portion 152A.

Figure 3B:
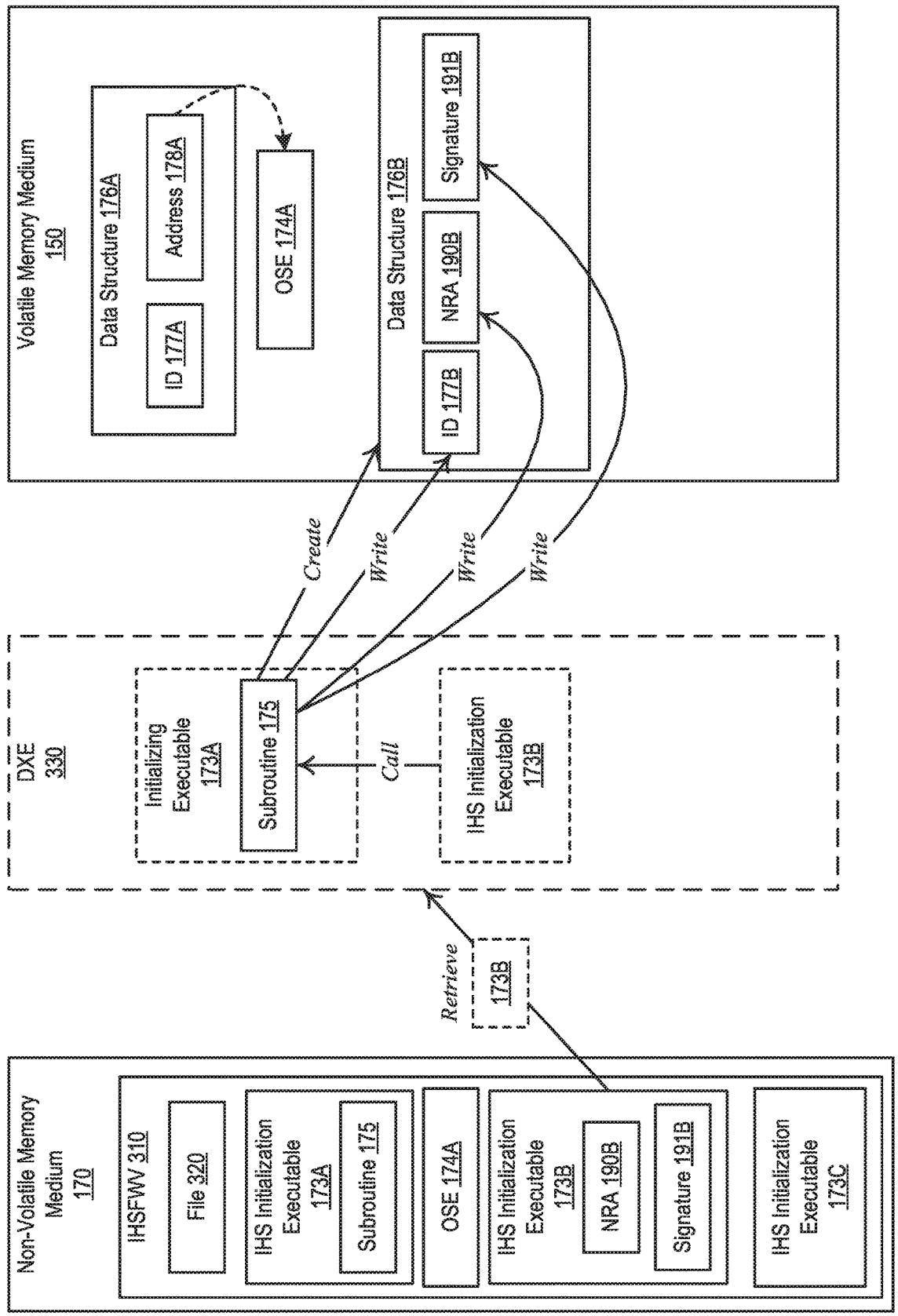
FIG. 3B illustrates an example of providing a network resource address to a data structure, according to one or more embodiments.

Turning now to FIG. 3B, an example of providing a network resource address to a data structure is illustrated, according to one or more embodiments. As shown, DXE 330 may retrieve IHS initialization executable 173B from non-volatile memory medium 170. For example, DXE 330 may retrieve IHS initialization executable 173B from IHSFWV 310. In one or more embodiments, processor 120 may execute IHS initialization executable 173B via DXE 330. For example, IHS initialization executable 173B may include a DXE driver.

As shown, IHS initialization executable 173B may include network resource address (NRA) 190B. As illustrated, IHS initialization executable 173B may include signature 191B. As shown, IHS initialization executable 173B may call subroutine 175. In one or more embodiments, IHS initialization executable 173B may provide NRA 190B to subroutine 175. In one or more embodiments, IHS initialization executable 173B may provide signature 191B to subroutine 175. As illustrated, subroutine 175 may create data structure 176B in volatile memory medium 150. In one or more embodiments, data structure 176B may be compliant with an ACPI table. As an example, data structure 176B may include an ACPI table. As illustrated, subroutine 175 may write ID 177B associated with one or more of NRA 190B and signature 191B to data structure 176B. For example, subroutine 175 may store, via data structure 176B, ID 177B associated with one or more of NRA 190B and signature 191B. As shown, subroutine 175 may write NRA 190B to data structure 176B. For example, subroutine 175 may store, via data structure 176B, NRA 190B associated with ID 177B. As illustrated, subroutine 175 may write signature 191B to data structure 176B. For example, subroutine 175 may store, via data structure 176B, signature 191B associated with ID 177B.

Figure 3C:
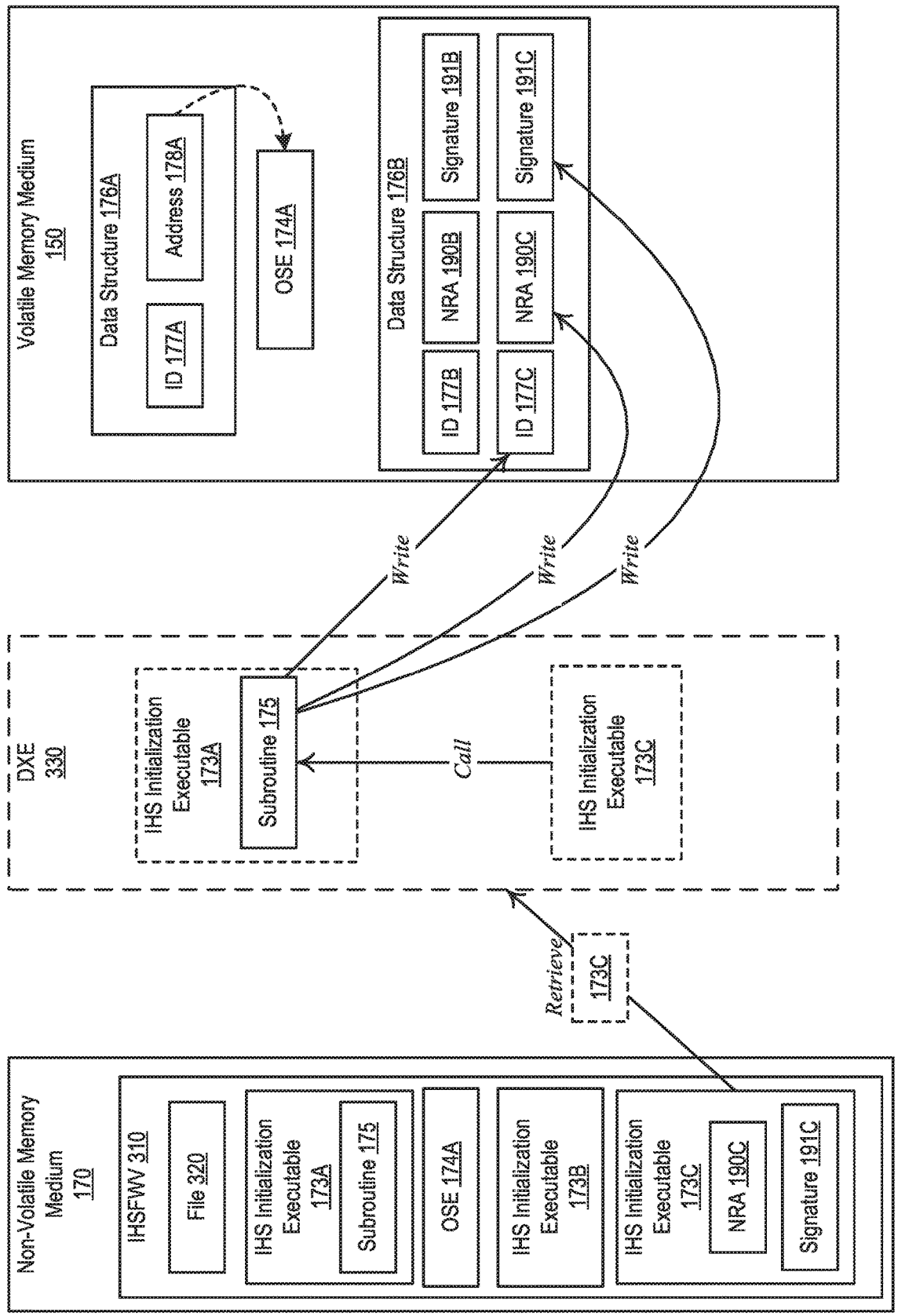
FIG. 3C illustrates another example of providing a network resource address to a data structure, according to one or more embodiments.

Turning now to FIG. 3C, another example of providing a network resource address to a data structure is illustrated, according to one or more embodiments. As shown, DXE 330 may retrieve IHS initialization executable 173C from non-volatile memory medium 170. For example, DXE 330 may retrieve IHS initialization executable 173C from IHSFWV 310. In one or more embodiments, processor 120 may execute IHS initialization executable 173C via DXE 330. For example, IHS initialization executable 173C may include a DXE driver.

As shown, IHS initialization executable 173C may include NRA 190C. As illustrated, IHS initialization executable 173C may include signature 191C. As shown, IHS initialization executable 173C may call subroutine 175. In one or more embodiments, IHS initialization executable 173C may provide NRA 190C to subroutine 175. In one or more embodiments, IHS initialization executable 173C may provide signature 191C to subroutine 175. As illustrated, subroutine 175 may write ID 177C associated with one or more of NRA 190C and signature 191C to data structure 176B. For example, subroutine 175 may store, via data structure 176B, ID 177C associated with one or more of NRA 190C and signature 191C. As shown, subroutine 175 may write NRA 190C to data structure 176B. For example, subroutine 175 may store, via data structure 176B, NRA 190C associated with ID 177C. As illustrated, subroutine 175 may write signature 191C to data structure 176B. For example, subroutine 175 may store, via data structure 176B, signature 191C associated with ID 177C.

Figure 3D:
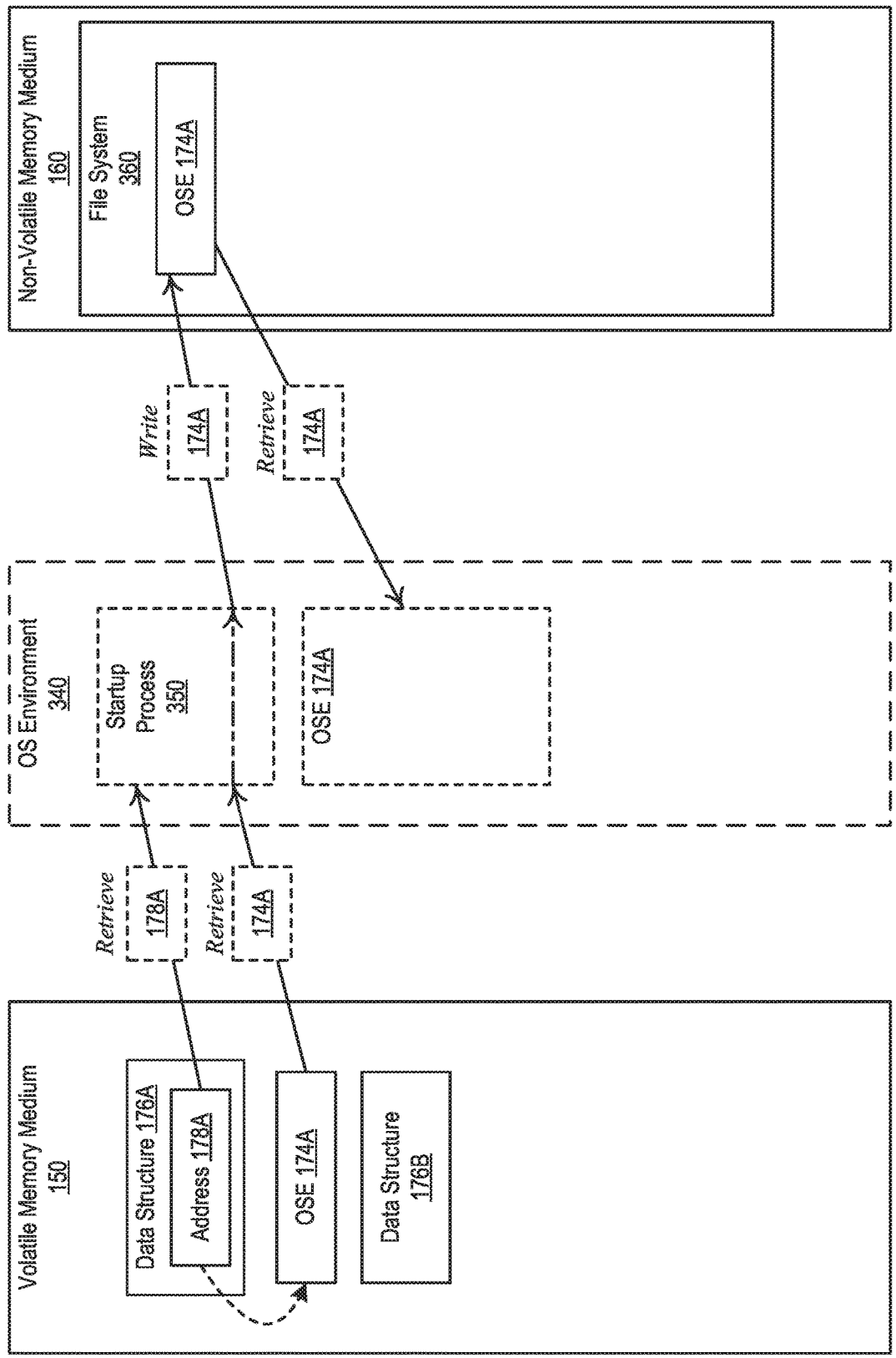
FIG. 3D illustrates an example of providing a first operating system executable to a non-volatile memory medium, according to one or more embodiments.

Turning now to FIG. 3D, an example of providing a first operating system executable to a non-volatile memory medium is illustrated, according to one or more embodiments. As shown, an OS environment 340 may include a startup process 350. In one or more embodiments, OS environment 340 may include OS 162 executed by processor 120. In one or more embodiments, startup process 350 may include a platform application controller. For example, startup process 350 may include one or more structures and/or one or more functionalities of a session manager.

As illustrated, startup process 350 may retrieve address 178A from data structure 176A. As shown, startup process 350 may retrieve OS executable 174A from volatile memory medium 150. For example, startup process 350 may retrieve OS executable 174A from volatile memory medium 150 based at least on address 178A. As illustrated, startup process 350 may write OS executable 174A to non-volatile memory medium 160. As shown, non-volatile memory medium 160 may include a file system 360. For example, startup process 350 may write OS executable 174A to file system 360.

In one or more embodiments, IHS initialization executable 173A may not be able to write OS executable 174A to file system 360. For example, IHS initialization executable 173A may not be configured to write OS executable 174A to file system 360. For instance, startup process 350 may copy OS executable 174A from volatile memory medium 150 to file system 360, since IHS initialization executable 173A may not be configured to write OS executable 174A to file system 360.

As illustrated, OS executable 174A may be retrieved from non-volatile memory medium 160. For example, OS executable 174A may be retrieved from file system 360. For example, startup process 350 may retrieve OS executable 174A from file system 360. In one or more embodiments, OS executable 174A may be executed via OS environment 340. For example, processor 120 may execute OS executable 174A via OS environment 340.

Figure 3E:
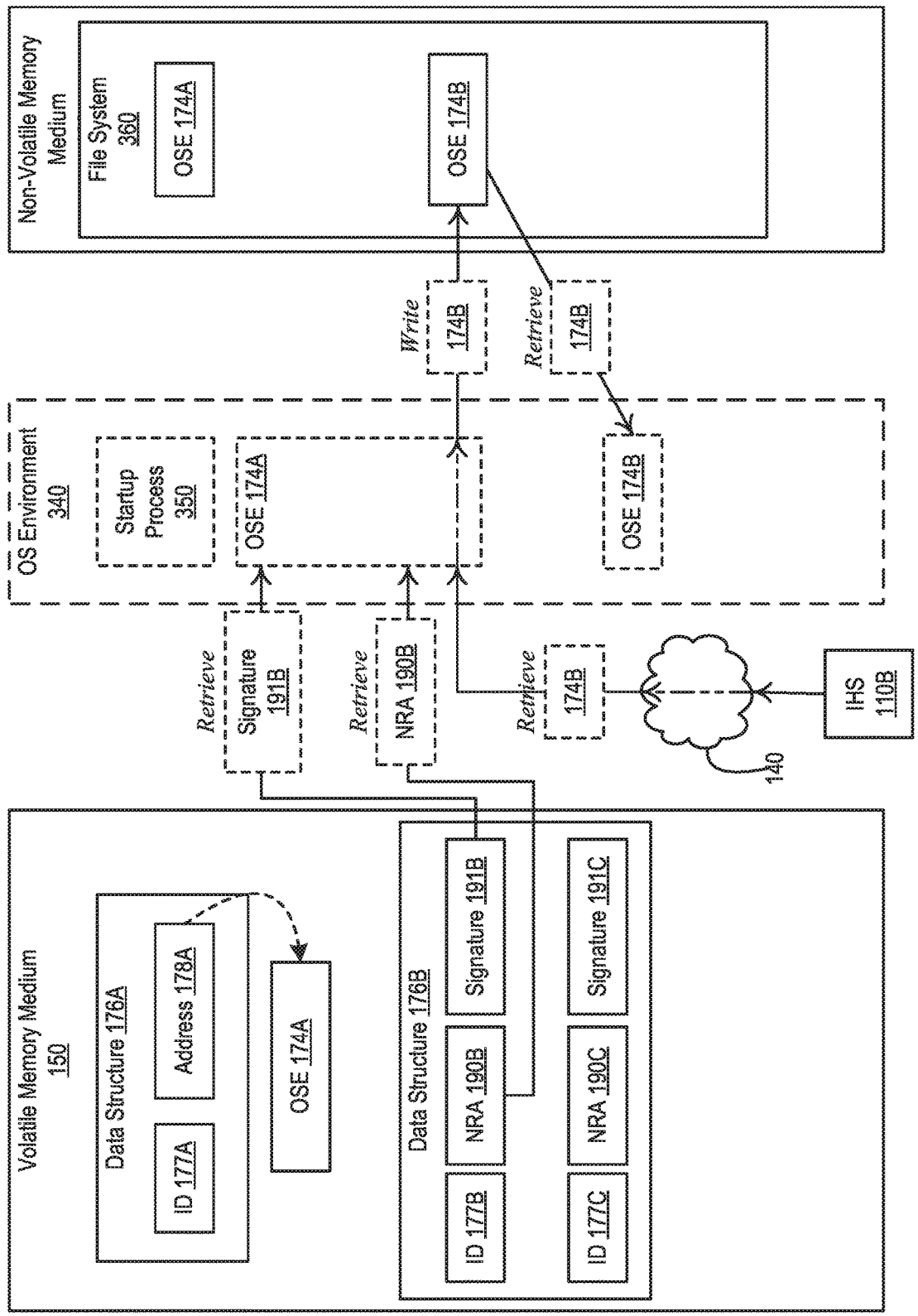
FIG. 3E illustrates an example of providing a second operating system executable to a non-volatile memory medium, according to one or more embodiments.

Turning now to FIG. 3E, an example of providing a second operating system executable to a non-volatile memory medium is illustrated, according to one or more embodiments. As shown, OS executable 174A may retrieve NRA 190B from data structure 176B. As illustrated, OS executable 174A may retrieve signature 191B from data structure 176B. As shown, OS executable 174A may retrieve OS executable 174B from IHS 100B via network 140. For example, OS executable 174A may retrieve OS executable 174B from IHS 110B based at least on NRA 190B. For instance, NRA 190B may include a URL, and OS executable 174A may utilize the URL to retrieve OS executable 174B from IHS 110B. As illustrated, OS executable 174A may write OS executable 174B to non-volatile memory medium 160. For example, OS executable 174A may write OS executable 174B to file system 360.

As illustrated, OS executable 174B may be retrieved from non-volatile memory medium 160. For example, OS executable 174B may be retrieved from file system 360. For instance, OS executable 174A may retrieve OS executable 174B from file system 360. In one or more embodiments, OS executable 174B may be executed. For example, processor 120 may execute OS executable 174B via OS environment 340. In one instance, OS executable 174A may instruct processor 120 to execute OS executable 174B. In another instance, user input may instruct processor 120 to execute OS executable 174B.

In one or more embodiments, OS executable 174B may be or include a background executable. In one example, OS executable 174B may include a MICROSOFT® WINDOWS® service. For instance, OS executable 174A may instruct a MICROSOFT® WINDOWS® service manager to start and/or execute OS executable 174B. In another example, OS executable 174B may include a daemon. For instance, the daemon may execute via a UNIX® OS or a Unix-like OS. As one example, OS executable 174A may instruct a launchd to start and/or execute OS executable 174B. For instance, OS 162 may include a MACOS®. As another example, OS executable 174A may instruct a systemd to start and/or execute OS executable 174B. For instance, OS 162 may include a LINUX® OS.

Figure 3F:
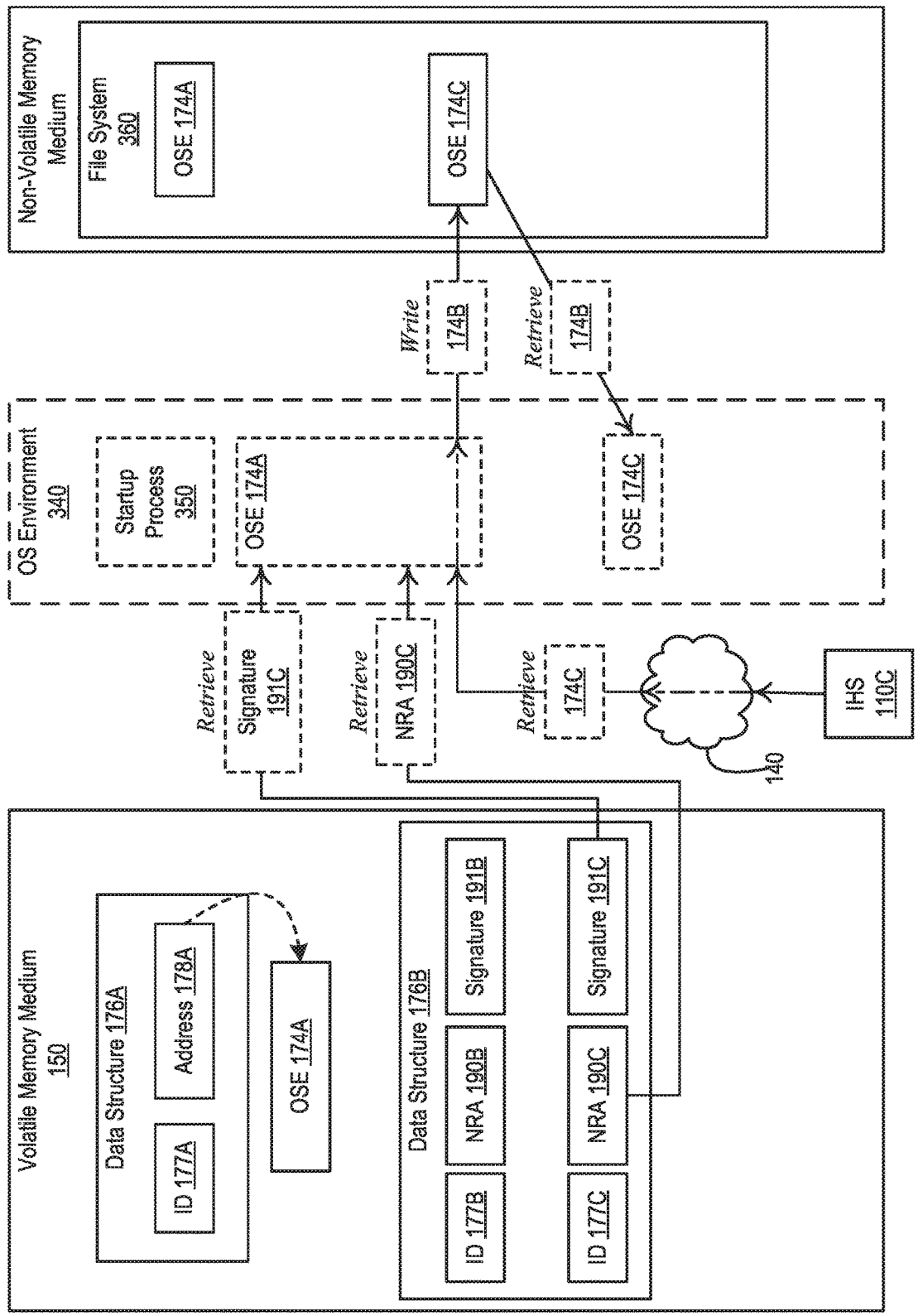
FIG. 3F illustrates an example of providing a third operating system executable to a non-volatile memory medium, according to one or more embodiments.

Turning now to FIG. 3F, an example of providing a third operating system executable to a non-volatile memory medium is illustrated, according to one or more embodiments. As shown, OS executable 174A may retrieve NRA 190C from data structure 176B. As illustrated, OS executable 174A may retrieve signature 191C from data structure 176B. As shown, OS executable 174A may retrieve OS executable 174C from IHS 100C via network 140. For example, OS executable 174A may retrieve OS executable 174C from IHS 110B based at least on NRA 190C. For instance, NRA 190C may include a URL, and OS executable 174A may utilize the URL to retrieve OS executable 174C from IHS 110B. As illustrated, OS executable 174A may write OS executable 174C to non-volatile memory medium 160. For example, OS executable 174A may write OS executable 174C to file system 360.

As illustrated, OS executable 174C may be retrieved from non-volatile memory medium 160. For example, OS executable 174C may be retrieved from file system 360. For instance, OS executable 174A may retrieve OS executable 174C from file system 360. In one or more embodiments, OS executable 174C may be executed. For example, processor 120 may execute OS executable 174C via OS environment 340. In one instance, OS executable 174A may instruct processor 120 to execute OS executable 174C. In another instance, user input may instruct processor 120 to execute OS executable 174C.

In one or more embodiments, OS executable 174C may be or include a background executable. In one example, OS executable 174C may include a MICROSOFT® WINDOWS® service. For instance, OS executable 174A may instruct a MICROSOFT® WINDOWS® service manager to start and/or execute OS executable 174C. In another example, OS executable 174B may include a daemon. For instance, the daemon may execute via a UNIX® OS or a Unix-like OS. As one example, OS executable 174A may instruct a launchd to start and/or execute OS executable 174C. For instance, OS 162 may include a MACOS®. As another example, OS executable 174A may instruct a systemd to start and/or execute OS executable 174C. For instance, OS 162 may include a LINUX® OS.

Figure 3G:
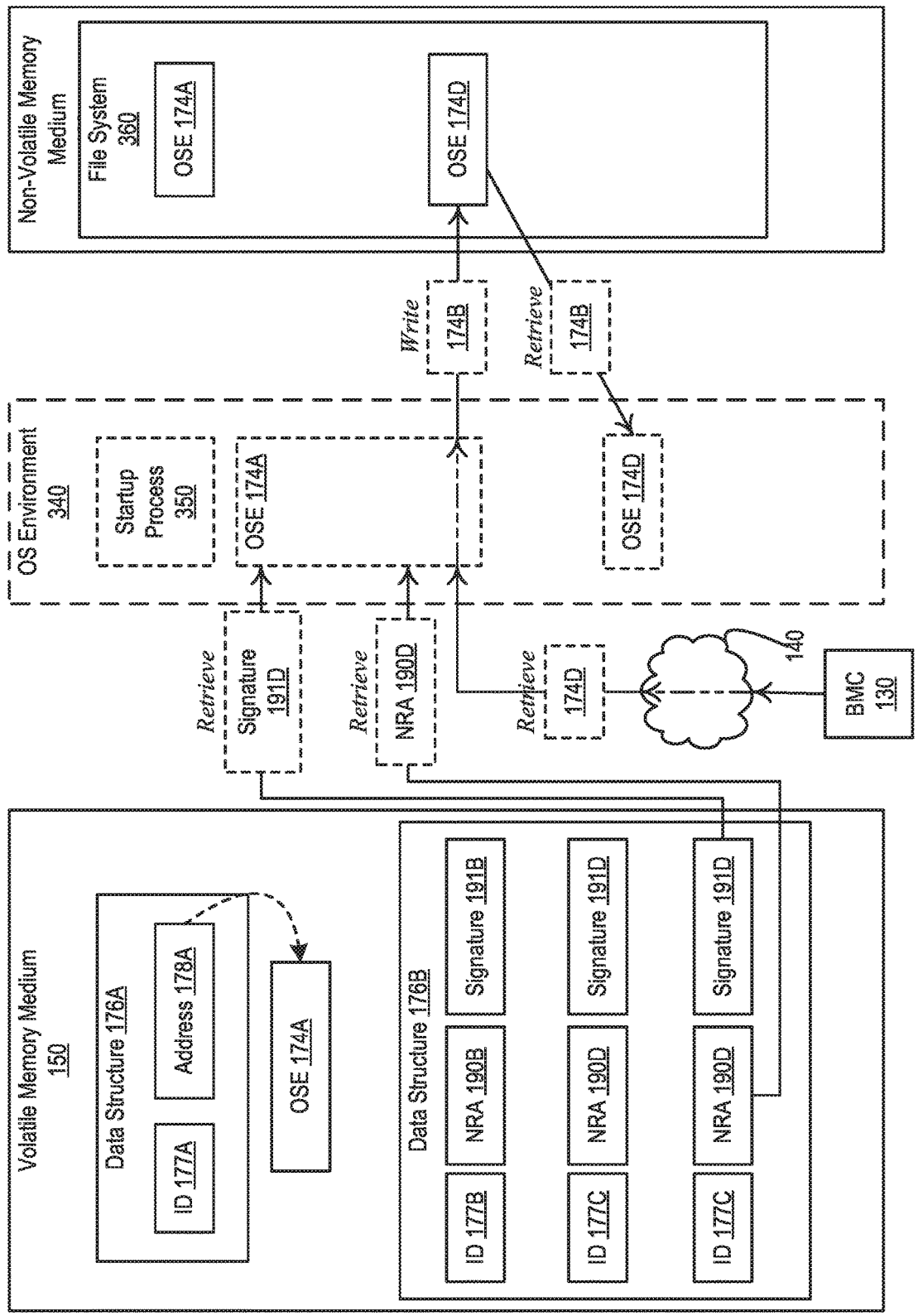
FIG. 3G illustrates an example of providing a fourth operating system executable to a non-volatile memory medium, according to one or more embodiments.

Turning now to FIG. 3G, an example of providing a fourth operating system executable to a non-volatile memory medium is illustrated, according to one or more embodiments. As shown, OS executable 174A may retrieve NRA 190D from data structure 176B. In one or more embodiments, NRA 190D and/or signature 191D may be stored via data structure 176B in a same or similar fashion as NRA 190D and/or signature 191D was stored via data structure 176B. As illustrated, OS executable 174A may retrieve signature 191D from data structure 176B. As shown, OS executable 174A may retrieve OS executable 174D from IHS 100C via network 140. For example, OS executable 174A may retrieve OS executable 174D from IHS 110B based at least on NRA 190D. For instance, NRA 190D may include a URL, and OS executable 174A may utilize the URL to retrieve OS executable 174D from IHS 110B. As illustrated, OS executable 174A may write OS executable 174D to non-volatile memory medium 160. For example, OS executable 174A may write OS executable 174D to file system 360.

As illustrated, OS executable 174D may be retrieved from non-volatile memory medium 160. For example, OS executable 174D may be retrieved from file system 360. For instance, OS executable 174A may retrieve OS executable 174D from file system 360. In one or more embodiments, OS executable 174D may be executed. For example, processor 120 may execute OS executable 174D via OS environment 340. In one instance, OS executable 174A may instruct processor 120 to execute OS executable 174D. In another instance, user input may instruct processor 120 to execute OS executable 174D.

In one or more embodiments, OS executable 174D may be or include a background executable. In one example, OS executable 174D may include a MICROSOFT® WINDOWS® service. For instance, OS executable 174A may instruct a MICROSOFT® WINDOWS® service manager to start and/or execute OS executable 174D. In another example, OS executable 174B may include a daemon. For instance, the daemon may execute via a UNIX® OS or a Unix-like OS. As one example, OS executable 174A may instruct a launchd to start and/or execute OS executable 174D. For instance, OS 162 may include a MACOS®. As another example, OS executable 174A may instruct a systemd to start and/or execute OS executable 174D. For instance, OS 162 may include a LINUX® OS.

Figure 3H:
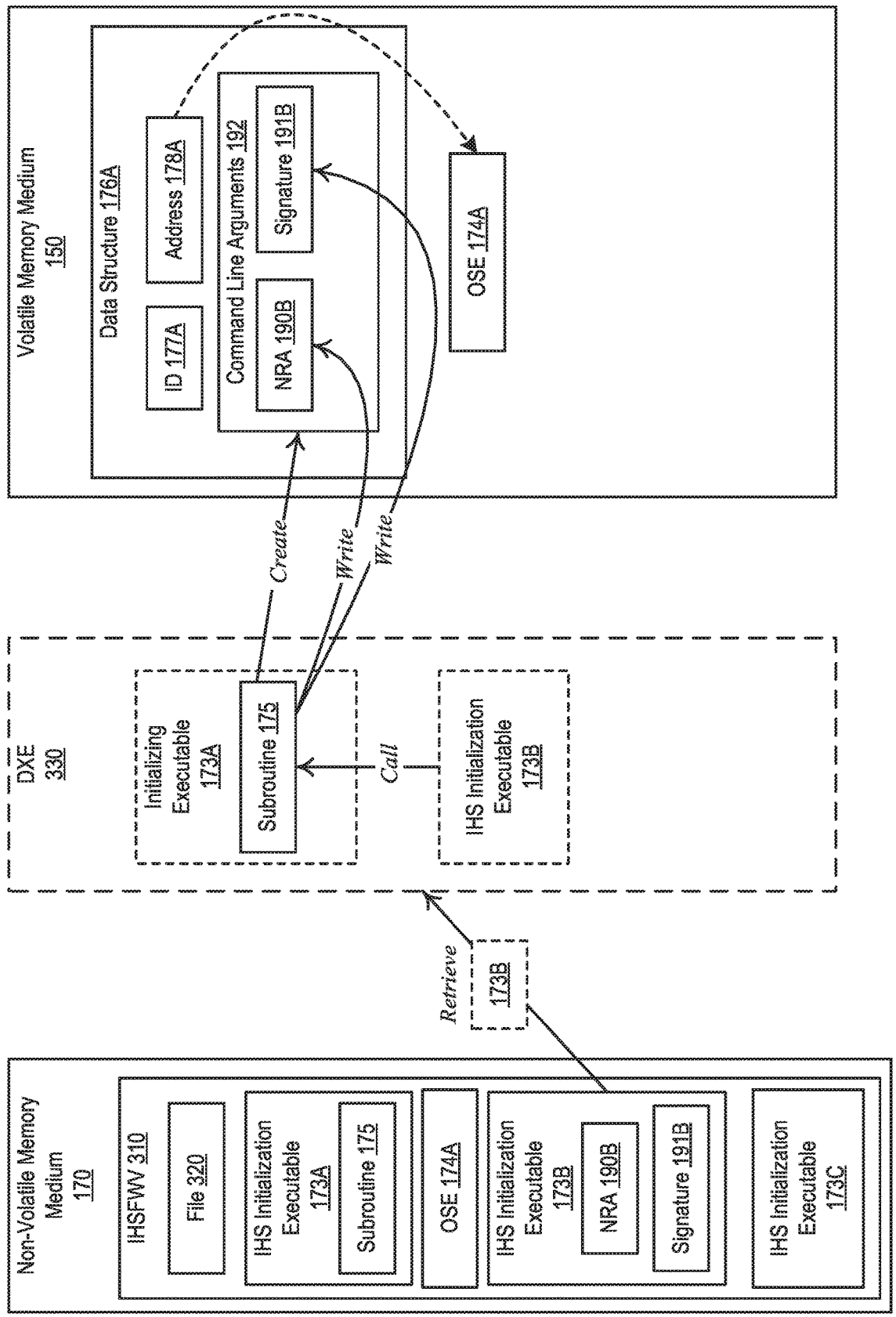
FIG. 3H illustrates an example of providing information associated with a second operating system executable to command line arguments, according to one or more embodiments.

Turning now to FIG. 3H, an example of providing information associated with a second operating system executable to command line arguments is illustrated, according to one or more embodiments. As shown, DXE 330 may retrieve IHS initialization executable 173B from non-volatile memory medium 170. For example, DXE 330 may retrieve IHS initialization executable 173B from IHSFWV 310. In one or more embodiments, processor 120 may execute IHS initialization executable 173B via DXE 330. For example, IHS initialization executable 173B may include a DXE driver.

As shown, IHS initialization executable 173B may include NRA 190B. As illustrated, IHS initialization executable 173B may include signature 191B. As shown, IHS initialization executable 173B may call subroutine 175. In one or more embodiments, IHS initialization executable 173B may provide NRA 190B to subroutine 175. In one or more embodiments, IHS initialization executable 173B may provide signature 191B to subroutine 175. As illustrated, subroutine 175 may create command line arguments 192. In one or more embodiments, command line arguments 192 may be stored via data structure 176A. As shown, subroutine 175 may write NRA 190B to command line arguments 192. As illustrated, subroutine 175 may write signature 191B to command line arguments 192.

Turning now to FIG. 3I, an example of providing information associated with a third operating system executable to command line arguments is illustrated, according to one or more embodiments. As shown, DXE 330 may retrieve IHS initialization executable 173C from non-volatile memory medium 170. For example, DXE 330 may retrieve IHS initialization executable 173C from IHSFWV 310. In one or more embodiments, processor 120 may execute IHS initialization executable 173C via DXE 330. For example, IHS initialization executable 173C may include a DXE driver.

As shown, IHS initialization executable 173C may include NRA 190C. As illustrated, IHS initialization executable 173C may include signature 191C. As shown, IHS initialization executable 173C may call subroutine 175. In one or more embodiments, IHS initialization executable 173C may provide NRA 190C to subroutine 175. In one or more embodiments, IHS initialization executable 173C may provide signature 191C to subroutine 175. As shown, subroutine 175 may write NRA 190C to command line arguments 192. As illustrated, subroutine 175 may write signature 191C to command line arguments 192.

Figure 3J:
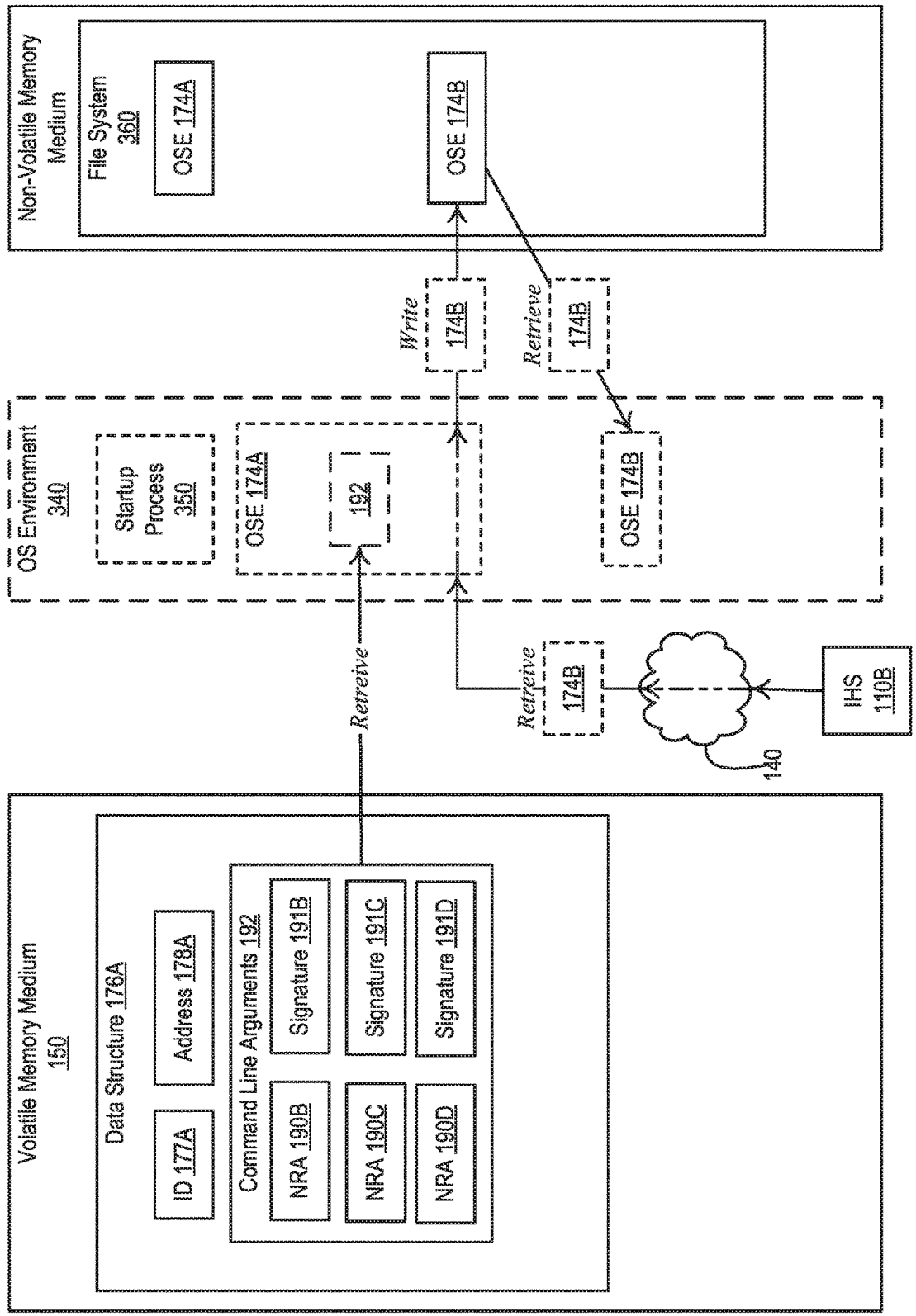
FIG. 3J illustrates a second example of providing a second operating system executable to a non-volatile memory medium, according to one or more embodiments.

Turning now to FIG. 3J, a second example of providing a second operating system executable to a non-volatile memory medium is illustrated, according to one or more embodiments. As shown, command line arguments may be retrieved by OSE 174A. As illustrated, OS executable 174A may retrieve OS executable 174B from IHS 100B via network 140. For example, OS executable 174A may retrieve OS executable 174B from IHS 110B based at least on NRA 190B. For instance, NRA 190B may include a URL, and OS executable 174A may utilize the URL to retrieve OS executable 174B from IHS 110B. As illustrated, OS executable 174A may write to OS executable 174B non-volatile memory medium 160. For example, OS executable 174A may write OS executable 174B to file system 360.

As illustrated, OS executable 174B may be retrieved from non-volatile memory medium 160. For example, OS executable 174B may be retrieved from file system 360. For instance, OS executable 174A may retrieve OS executable 174B from file system 360. In one or more embodiments, OS executable 174B may be executed. For example, processor 120 may execute OS executable 174B via OS environment 340. In one instance, OS executable 174A may instruct processor 120 to execute OS executable 174B. In another instance, user input may instruct processor 120 to execute OS executable 174B.

In one or more embodiments, OS executable 174B may be or include a background executable. In one example, OS executable 174B may include a MICROSOFT® WINDOWS® service. For instance, OS executable 174A may instruct a MICROSOFT® WINDOWS® service manager to start and/or execute OS executable 174B. In another example, OS executable 174B may include a daemon. For instance, the daemon may execute via a UNIX® OS or a Unix-like OS. As one example, OS executable 174A may instruct a launchd to start and/or execute OS executable 174B. For instance, OS 162 may include a MACOS®. As another example, OS executable 174A may instruct a systemd to start and/or execute OS executable 174B. For instance, OS 162 may include a LINUX® OS.

Turning now to FIG. 3K, a second example of providing a third operating system executable to a non-volatile memory medium is illustrated, according to one or more embodiments. As shown, OS executable 174A may retrieve OS executable 174C from IHS 100C via network 140. For example, OS executable 174A may retrieve OS executable 174C from IHS 110B based at least on NRA 190C. For instance, NRA 190C may include a URL, and OS executable 174A may utilize the URL to retrieve OS executable 174C from IHS 110B. As illustrated, OS executable 174A may write to OS executable 174C non-volatile memory medium 160. For example, OS executable 174A may write OS executable 174C to file system 360.

As shown, OS executable 174C may be retrieved from non-volatile memory medium 160. For example, OS executable 174C may be retrieved from file system 360. For instance, OS executable 174A may retrieve OS executable 174C from file system 360. In one or more embodiments, OS executable 174C may be executed. For example, processor 120 may execute OS executable 174C via OS environment 340. In one instance, OS executable 174A may instruct processor 120 to execute OS executable 174C. In another instance, user input may instruct processor 120 to execute OS executable 174C.

In one or more embodiments, OS executable 174C may be or include a background executable. In one example, OS executable 174C may include a MICROSOFT® WINDOWS® service. For instance, OS executable 174A may instruct a MICROSOFT® WINDOWS® service manager to start and/or execute OS executable 174C. In another example, OS executable 174C may include a daemon. For instance, the daemon may execute via a UNIX® OS or a Unix-like OS. As one example, OS executable 174A may instruct a launchd to start and/or execute OS executable 174C. For instance, OS 162 may include a MACOS®. As another example, OS executable 174A may instruct a systemd to start and/or execute OS executable 174C. For instance, OS 162 may include a LINUX® OS.

Turning now to FIG. 3L, a second example of providing a fourth operating system executable to a non-volatile memory medium is illustrated, according to one or more embodiments. As shown, OS executable 174A may retrieve OS executable 174D from IHS 100C via network 140. For example, OS executable 174A may retrieve OS executable 174D from BMC 130 based at least on NRA 190D. For instance, NRA 190D may include a URL, and OS executable 174A may utilize the URL to retrieve OS executable 174D from BMC 130. As illustrated, OS executable 174A may write to OS executable 174D non-volatile memory medium 160. For example, OS executable 174A may write OS executable 174D to file system 360.

As illustrated, OS executable 174D may be retrieved from non-volatile memory medium 160. For example, OS executable 174D may be retrieved from file system 360. For instance, OS executable 174A may retrieve OS executable 174D from file system 360. In one or more embodiments, OS executable 174D may be executed. For example, processor 120 may execute OS executable 174D via OS environment 340. In one instance, OS executable 174A may instruct processor 120 to execute OS executable 174D. In another instance, user input may instruct processor 120 to execute OS executable 174D.

In one or more embodiments, OS executable 174D may be or include a background executable. In one example, OS executable 174D may include a MICROSOFT® WINDOWS® service. For instance, OS executable 174A may instruct a MICROSOFT® WINDOWS® service manager to start and/or execute OS executable 174D. In another example, OS executable 174D may include a daemon. For instance, the daemon may execute via a UNIX® OS or a Unix-like OS. As one example, OS executable 174A may instruct a launchd to start and/or execute OS executable 174D. For instance, OS 162 may include a MACOS®. As another example, OS executable 174A may instruct a systemd to start and/or execute OS executable 174D. For instance, OS 162 may include a LINUX® OS.

Figure 3M:
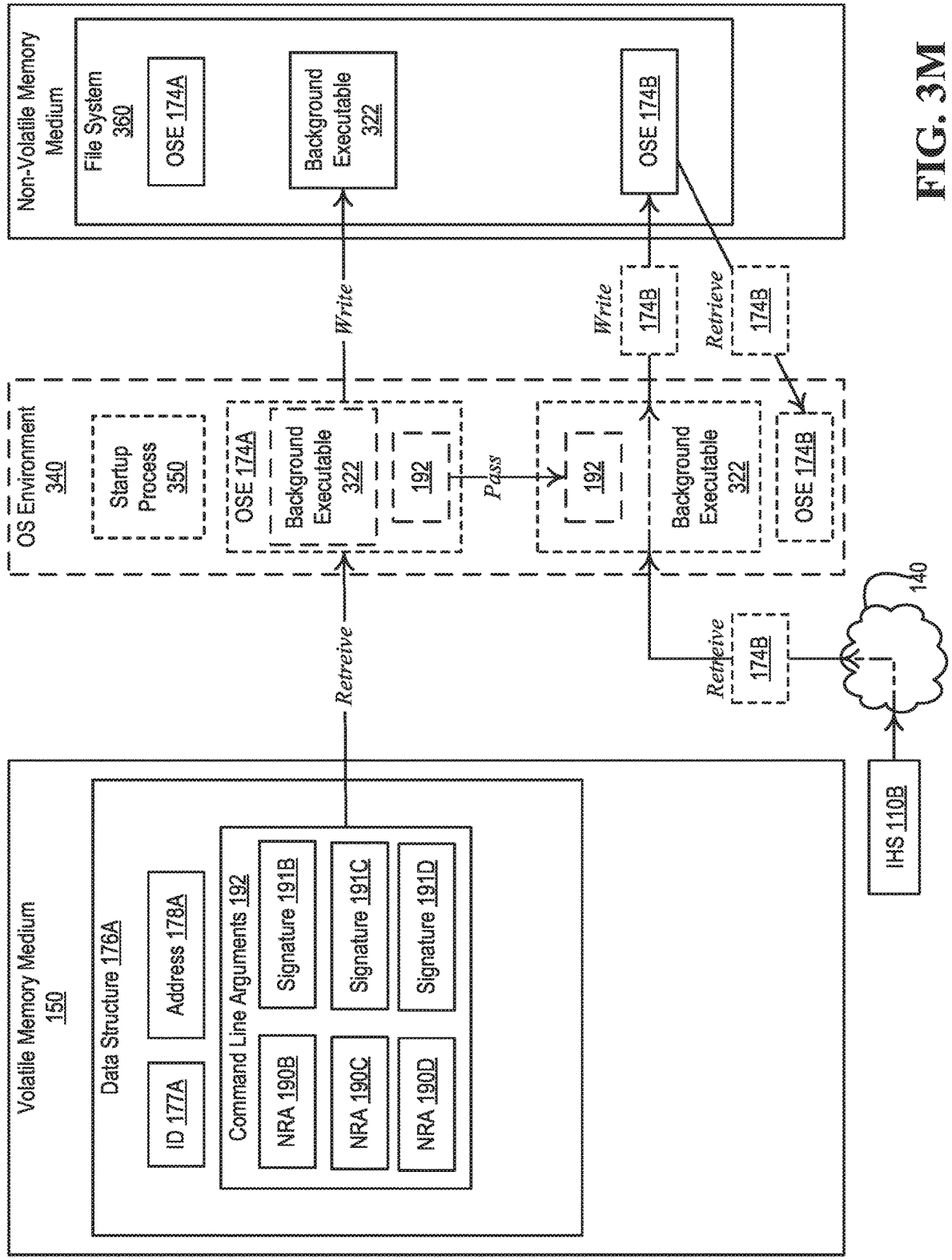
FIG. 3M illustrates another example of providing a second operating system executable to a non-volatile memory medium, according to one or more embodiments.

Turning now to FIG. 3M, another example of providing a second operating system executable to a non-volatile memory medium is illustrated, according to one or more embodiments. As shown, OS executable 174A may retrieve command line arguments from data structure 176A. As illustrated, OS executable 174A may write background executable 322 to non-volatile memory medium 160. For example, OS executable 174A may write background executable 322 to file system 360.

As shown, command line arguments 192 may be passed to background executable 322. As illustrated, background executable 322 may retrieve OS executable 174B from IHS 100B via network 140. For example, background executable 322 may retrieve OS executable 174B from IHS 110B based at least on NRA 190B. For instance, NRA 190B may include a URL, and background executable 322 may utilize the URL to retrieve OS executable 174B from IHS 110B. As illustrated, background executable 322 may write OS executable 174B non-volatile memory medium 160. For example, background executable 322 may write OS executable 174B to file system 360.

As illustrated, OS executable 174B may be retrieved from non-volatile memory medium 160. For example, OS executable 174B may be retrieved from file system 360. For instance, background executable 322 may retrieve OS executable 174B from file system 360. In one or more embodiments, OS executable 174B may be executed. For example, processor 120 may execute OS executable 174B via OS environment 340. In one instance, background executable 322 may instruct processor 120 to execute OS executable 174B. In another instance, user input may instruct processor 120 to execute OS executable 174B.

In one or more embodiments, OS executable 174B may be or include a background executable. In one example, OS executable 174B may include a MICROSOFT® WINDOWS® service. For instance, background executable 322 may instruct a MICROSOFT® WINDOWS® service manager to start and/or execute OS executable 174B. In another example, OS executable 174B may include a daemon. For instance, the daemon may execute via a UNIX® OS or a Unix-like OS. As one example, background executable 322 may instruct a launchd to start and/or execute OS executable 174B. For instance, OS 162 may include a MACOS®. As another example, background executable 322 may instruct a systemd to start and/or execute OS executable 174B. For instance, OS 162 may include a LINUX® OS.

Figure 3N:
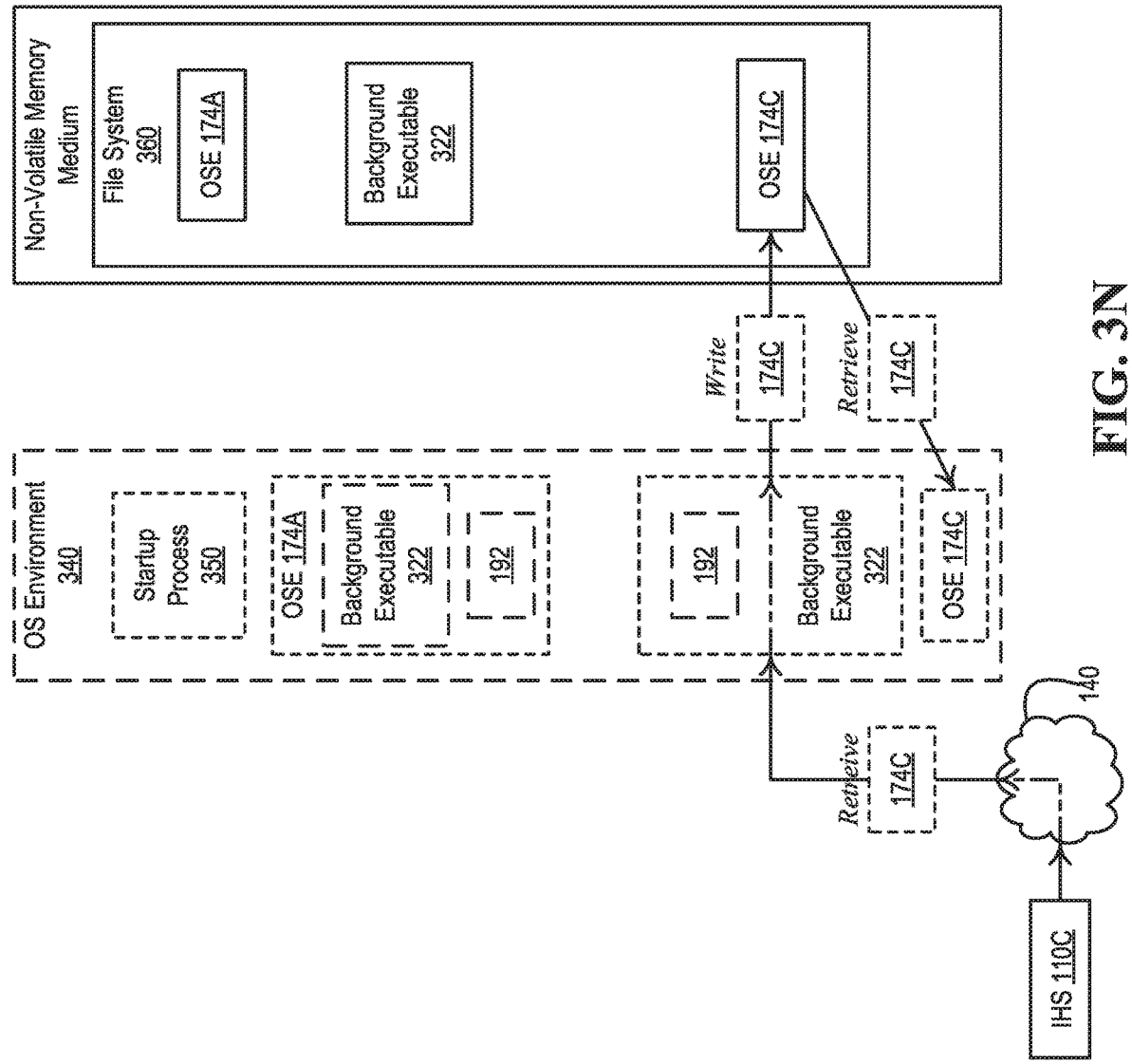
FIG. 3N illustrates another example of providing a third operating system executable to a non-volatile memory medium, according to one or more embodiments.
Figure 30:
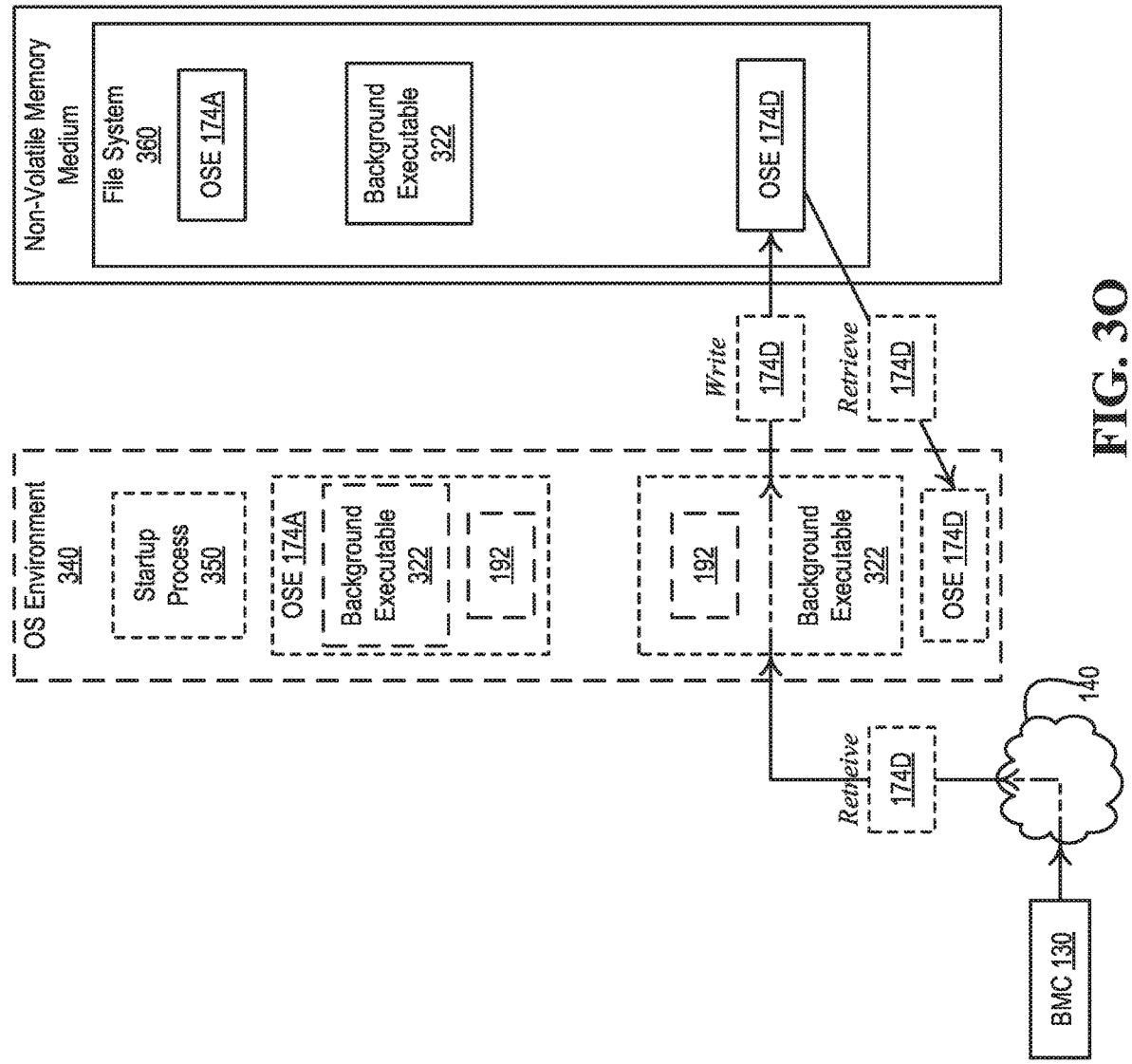

Turning now to FIG. 3N, another example of providing a third operating system executable to a non-volatile memory medium is illustrated, according to one or more embodiments. As shown, background executable 322 may retrieve OS executable 174C from IHS 100B via network 140. For example, background executable 322 may retrieve OS executable 174C from IHS 110B based at least on NRA 190C. For instance, NRA 190C may include a URL, and background executable 322 may utilize the URL to retrieve OS executable 174C from IHS 110B. As illustrated, background executable 322 may write OS executable 174C non-volatile memory medium 160. For example, background executable 322 may write OS executable 174C to file system 360.

As illustrated, OS executable 174C may be retrieved from non-volatile memory medium 160. For example, OS executable 174C may be retrieved from file system 360. For instance, background executable 322 may retrieve OS executable 174C from file system 360. In one or more embodiments, OS executable 174C may be executed. For example, processor 120 may execute OS executable 174C via OS environment 340. In one instance, background executable 322 may instruct processor 120 to execute OS executable 174C. In another instance, user input may instruct processor 120 to execute OS executable 174C.

In one or more embodiments, OS executable 174C may be or include a background executable. In one example, OS executable 174C may include a MICROSOFT® WIN- DOWS® service. For instance, background executable 322 may instruct a MICROSOFT® WINDOWS® service manager to start and/or execute OS executable 174C. In another example, OS executable 174C may include a daemon. For instance, the daemon may execute via a UNIX® OS or a Unix-like OS. As one example, background executable 322 may instruct a launchd to start and/or execute OS executable 174C. For instance, OS 162 may include a MACOS®. As another example, background executable 322 may instruct a systemd to start and/or execute OS executable 174C. For instance, OS 162 may include a LINUX® OS.

Turning now to FIG. 3O, another example of providing a fourth operating system executable to a non-volatile memory medium is illustrated, according to one or more embodiments. As shown, background executable 322 may retrieve OS executable 174D from BMC 130 via network 140. For example, background executable 322 may retrieve OS executable 174D from BMC 130 based at least on NRA 190D. For instance, NRA 190D may include a URL, and background executable 322 may utilize the URL to retrieve OS executable 174D from BMC 130. As illustrated, background executable 322 may write OS executable 174D non-volatile memory medium 160. For example, background executable 322 may write OS executable 174D to file system 360.

As illustrated, OS executable 174D may be retrieved from non-volatile memory medium 160. For example, OS executable 174D may be retrieved from file system 360. For instance, background executable 322 may retrieve OS executable 174D from file system 360. In one or more embodiments, OS executable 174D may be executed. For example, processor 120 may execute OS executable 174D via OS environment 340. In one instance, background executable 322 may instruct processor 120 to execute OS executable 174D. In another instance, user input may instruct processor 120 to execute OS executable 174D.

In one or more embodiments, OS executable 174D may be or include a background executable. In one example, OS executable 174D may include a MICROSOFT® WINDOWS® service. For instance, background executable 322 may instruct a MICROSOFT® WINDOWS® service manager to start and/or execute OS executable 174D. In another example, OS executable 174D may include a daemon. For instance, the daemon may execute via a UNIX® OS or a Unix-like OS. As one example, background executable 322 may instruct a launchd to start and/or execute OS executable 174D. For instance, OS 162 may include a MACOS®. As another example, background executable 322 may instruct a systemd to start and/or execute OS executable 174D. For instance, OS 162 may include a LINUX® OS.

Figure 4A:
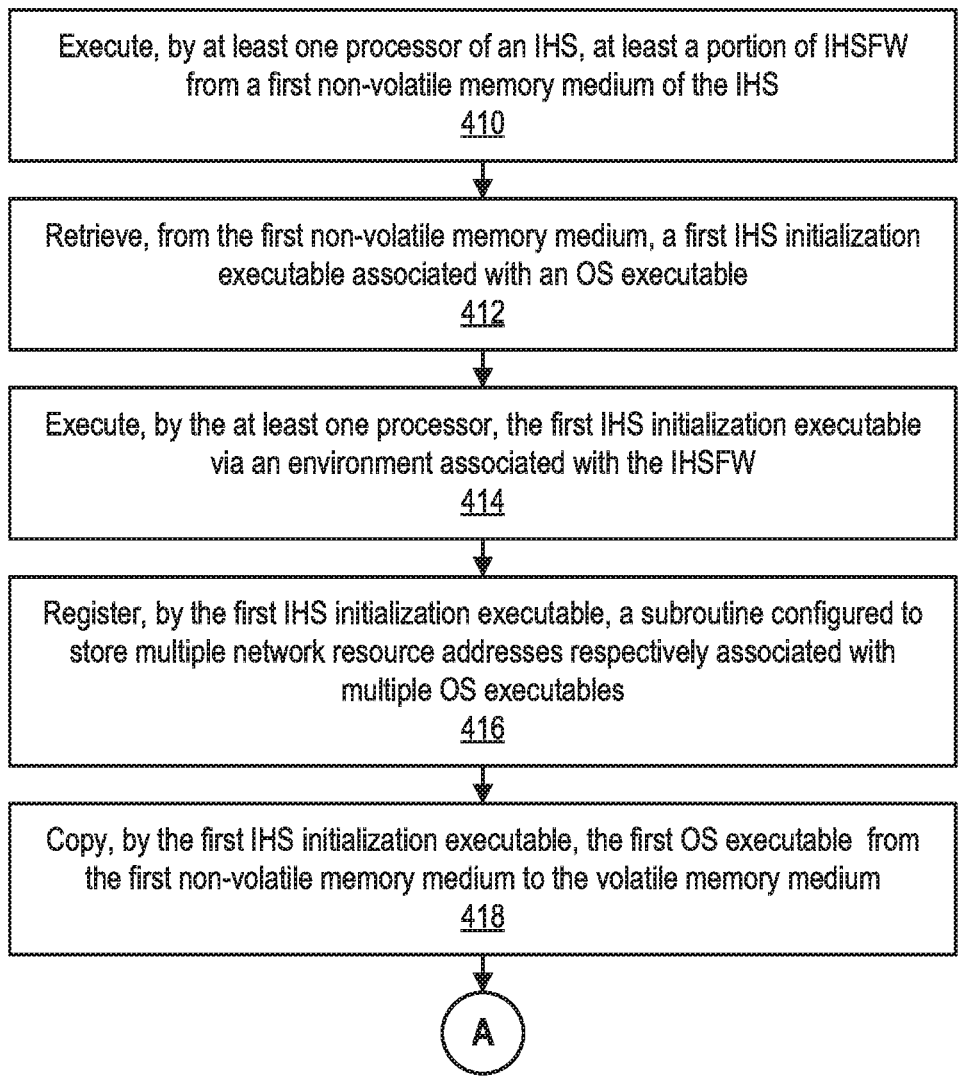
FIGS. 4A and 4B illustrate an example of a method of operating an information handling system, according to one or more embodiments.
Figure 4B:
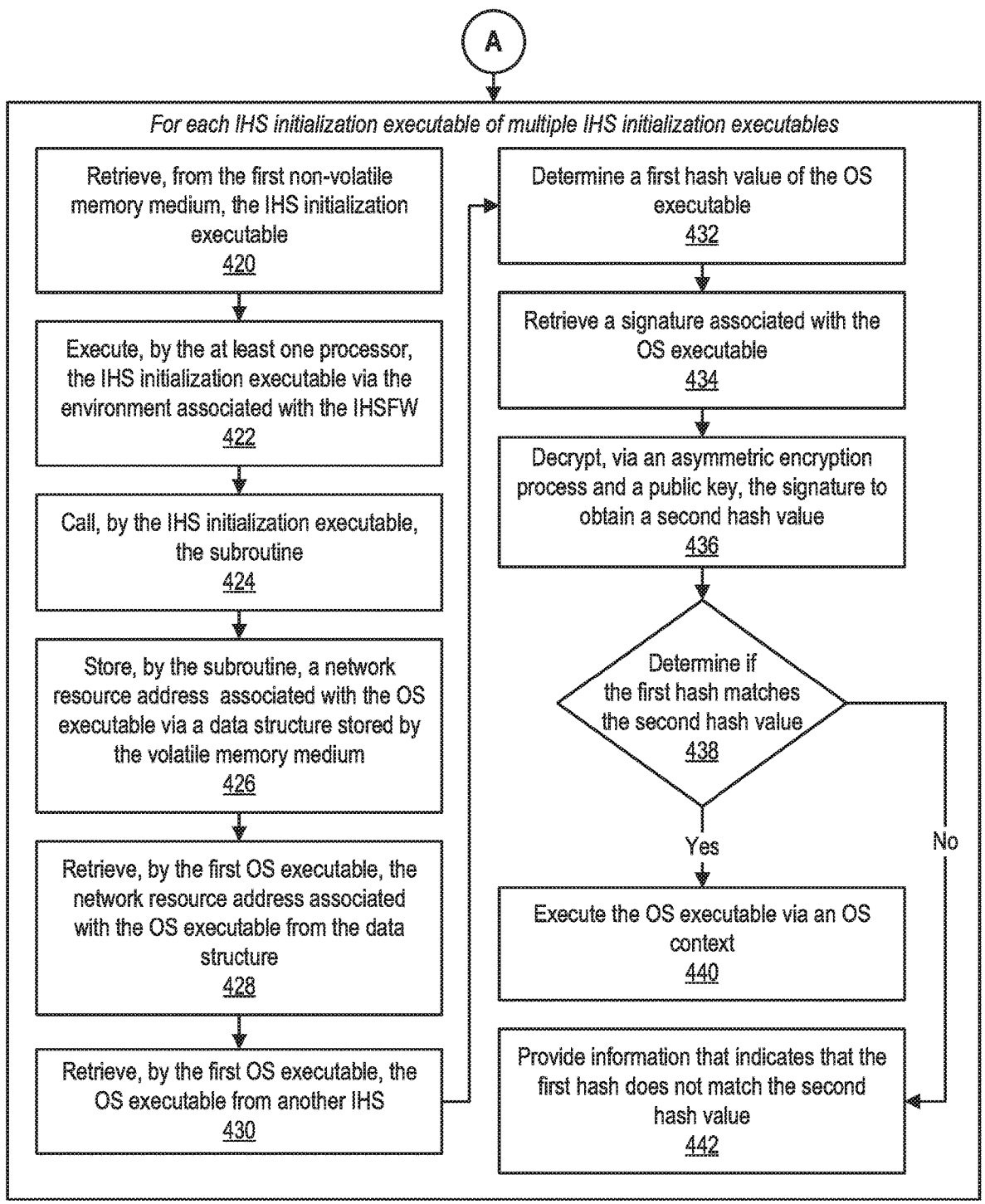

Turning now to FIGS. 4A and 4B, an example of a method of operating an information handling system is illustrated, according to one or more embodiments. At 410, at least one processor of an IHS may execute at least a portion of IHSFW from a first non-volatile memory medium of the IHS. For example, processor 120 may execute at least a portion of IHSFW 172 from non-volatile memory medium 170. In one or more embodiments, the at least the portion of IHSFW 172 may include DXE 330.

At 412, a first IHS initialization executable of a first IHS initialization executable associated with a first OS executable may be retrieved from the first non-volatile memory medium. For example, IHS initialization executable 173A may be retrieved from non-volatile memory medium 170. For instance, processor 120 may retrieve executable 173A from non-volatile memory medium 170. In one or more embodiments, DXE 330 may retrieve executable 173A from non-volatile memory medium 170.

At 414, the at least one processor may execute the first IHS initialization executable via an environment associated with the IHSFW. For example, processor 120 may execute IHS initialization executable 173A via an environment associated with IHSFW 172. For instance, the environment associated with IHSFW 172 may include DXE 330. At 416, the first IHS initialization executable may register a subroutine configured to store multiple network resource addresses respectively associated with multiple OS executables. For example, IHS initialization executable 173A may register subroutine 175. For instance, subroutine 175 may be configured to store network resource addresses 190B-190N respectively associated with multiple OS executables 174B-174N.

At 418, the first IHS initialization executable may copy the first OS executable from the first non-volatile memory medium to the volatile memory medium. For example, IHS initialization executable 173A may copy OS executable 174A from non-volatile memory medium 170 to volatile memory medium 150. In one or more embodiments, copying the first OS executable from the first non-volatile memory medium to the volatile memory medium may include retrieving the first OS executable from the volatile memory medium. For example, IHS initialization executable 173A may retrieve OS executable 174A from non-volatile memory medium 170. In one or more embodiments, copying the first OS executable from the first non-volatile memory medium to the volatile memory medium may include writing the first OS executable to the volatile memory medium. For example, IHS initialization executable 173A may write OS executable 174A to volatile memory medium 150.

In one or more embodiments, method elements 420-442 may be performed for each IHS initialization executable of multiple IHS initialization executables. For example, method elements 420-442 may be performed for each IHS initialization executable of multiple IHS initialization executables 173B-173N. At 420, the IHS initialization executable may be retrieved from the first non-volatile memory medium. For example, an IHS initialization executable 173 of IHS initialization executables 173B-173N may be retrieved from non-volatile memory medium 170. In one instance, IHS initialization executable 173B of IHS initialization executable 173B may be retrieved from non-volatile memory medium 170. In another instance, IHS initialization executable 173C may be retrieved from non-volatile memory medium 170.

At 422, the at least one processor may execute the IHS initialization executable via the environment associated with the IHSFW. For example, processor 120 may execute IHS initialization executable 173 of IHS initialization executables 173B-173N via the environment associated with IHSFW 172. In one instance, processor 120 may execute IHS initialization executable 173B via the environment associated with IHSFW 172. In another instance, processor 120 may execute IHS initialization executable 173C via the environment associated with IHSFW 172. In one or more embodiments, the environment associated with IHSFW 172 may include DXE 330.

At 424, the IHS initialization executable may call the subroutine. In one or more embodiments, IHS initialization executable 173 of IHS initialization executables 173B-173N may call subroutine 175. In one example, IHS initialization executable 173B may call subroutine 175. For instance, IHS initialization executable 173B may pass NRA 190B and/or signature 191B to subroutine 175. In another example, IHS initialization executable 173C may call subroutine 175. For instance, IHS initialization executable 173C may pass NRA 190C and signature 191C to subroutine 175.

At 426, the subroutine may store a network resource address associated with an OS executable via a data structure stored by the volatile memory medium. For example, subroutine 175 may store a network resource address 190 associated with OS executable 174 of OS executables 174B-174N via data structure 176B. In one instance, subroutine 175 may store NRA 190B and/or signature 191B associated with OS executable 174B via data structure 176B. In another instance, subroutine 175 may store NRA 190B and/or signature 191C associated with OS executable 174C via data structure 176B.

At 428, the first OS executable may retrieve the network resource address associated with the OS executable from the data structure. For example, OS executable 174A may retrieve the network resource address associated with OS executable 174 of OS executable 174B-174N from data structure 176B. In one instance, OS executable 174A may retrieve NRA 190B associated with OS executable 174B from data structure 176B. In another instance, OS executable 174A may retrieve NRA 190C associated with OS executable 174C from data structure 176B.

At 430, the first OS executable may retrieve the OS executable from another information handling system based at least on the network resource address. In one example, OS executable 174A may retrieve OS executable 174 of OS executable 174B-174N from an IHS 110 of IHSs 110B-110N based at least on network resource address 190. For instance, OS executable 174A may retrieve OS executable 174 of OS executable 174B-174N from an IHS 110 of IHSs 110B-110N based at least on network resource address 190 via network 140. As an example, OS executable 174A may retrieve OS executable 174B from an IHS 110 of IHSs 110B-110N based at least on network resource address 190B via network 140. As another example, OS executable 174A may retrieve OS executable 174C from an IHS 110 of IHSs 110B-110N based at least on network resource address 190C via network 140. In another example, OS executable 174A may retrieve OS executable 174 of OS executable 174B-174N from BMC 130 based at least on network resource address 190. For instance, OS executable 174A may retrieve OS executable 174 of OS executable 174B-174N from BMC 130 based at least on network resource address 190 via network 140.

In one or more embodiments, retrieving an OS executable from another information handling system based at least on the network resource address may include IHS 110A retrieving the OS executable from an IHS 110 of IHSs 110B-110N. In one or more embodiments, retrieving an OS executable from another information handling system based at least on the network resource address may include IHS 110A retrieving the OS executable from BMC 130 of IHS 110A. In one or more embodiments, retrieving an OS executable from another information handling system based at least on the network resource address may include downloading the OS executable from the other information handling system based at least on the network resource address or may include downloading the OS executable from the BMC based at least on the network resource address.

At 432, a first hash value of the OS executable may be determined. For example, the first hash value of the OS executable may be determined via a one-way hash function. For instance, a hash value of OS executable 174 may be determined via a one-way hash function. As one example, a hash value of OS executable 174B may be determined via the one-way hash function. As another example, a hash value of OS executable 174C may be determined via the one-way hash function. In one or more embodiments, determining a hash value of an OS executable via the one-way hash function may include providing the OS executable as input to the one-way hash function.

In one or more embodiments, a one-way hash function, h(z), may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or said to be strengthened.

At 434, a signature associated with the OS executable may be retrieved from the data structure stored by the volatile memory medium. For example, OS executable 174A may retrieve signature 190, associated with OS executable 174, from data structure 176B stored by volatile memory medium 150. In one instance, OS executable 174A may retrieve signature 190B, associated with OS executable 174B, from data structure 176B. In another instance, OS executable 174A may retrieve signature 190C, associated with OS executable 174B, from data structure 176B.

At 436, the signature may be decrypted, via an asymmetric encryption process and a public encryption key, to obtain a second hash value. For example, signature 191 associated with OS executable 174 may be decrypted, via an asymmetric encryption process and a public encryption key, to obtain a second hash value. For instance, the public key may be associated with a private encryption key. In one or more embodiments, the private encryption key may be different from the public encryption key. For example, the private encryption key and the public encryption key may be asymmetric encryption keys. In one instance, data encrypted via the private encryption key may be decrypted via the public encryption key to obtain the data. In another instance, data encrypted via the public encryption key may be decrypted via the private encryption key to obtain the data. In one or more embodiments, signature 191 associated with OS executable 174 may include encrypted data of a hash value of OS executable 174. For example, a hash value of OS executable 174 may have been encrypted, via the asymmetric encryption process, with the private encryption key to produce signature 191.

At 438, it may be determined if the first hash matches the second hash value. If the first hash matches the second hash value, the OS executable may be executed via an OS environment, at 440. For example, if the first hash matches the second hash value, OS executable 174 may be executed via an OS environment. For example, processor 120 may execute OS executable 174 via OS environment 340. In one or more embodiments, the OS environment may include an OS context. For example, the OS context may include access of file system 360, access to one or more libraries of OS 162, and/or access of one or more subroutines provided by OS 162, among others. In one or more embodiments, if the first hash matches the second hash value, OS executable 174 may be stored via non-volatile memory medium 160.

If the first hash does not match the second hash value, information that indicates that the first hash does not match the second hash value may be provided, at 442. For example, if the first hash does not match the second hash value, information that indicates that OS executable 174 is not valid may be provided. In one instance, if the first hash does not match the second hash value, information that indicates that OS executable 174 will not be executed may be provided. In another instance, if the first hash does not match the second hash value, information that indicates that an error associated with OS executable 174 or an issue associated with OS executable 174 may be provided. In one or more embodiments, if the first hash does not match the second hash value, OS executable 174 may not be stored via non-volatile memory medium 160.

Figure 5A:
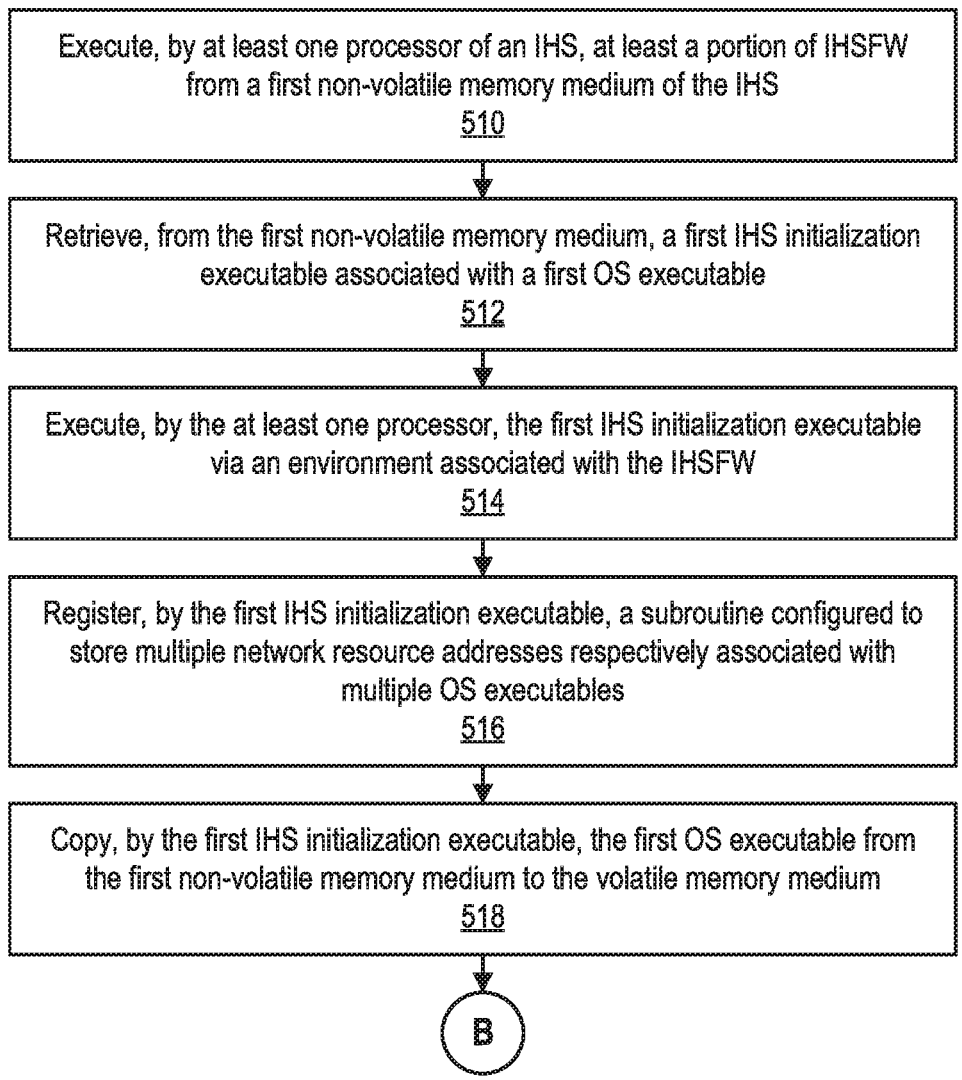
FIGS. 5A-5C illustrate another example of a method of operating an information handling system, according to one or more embodiments.
Figure 5B:
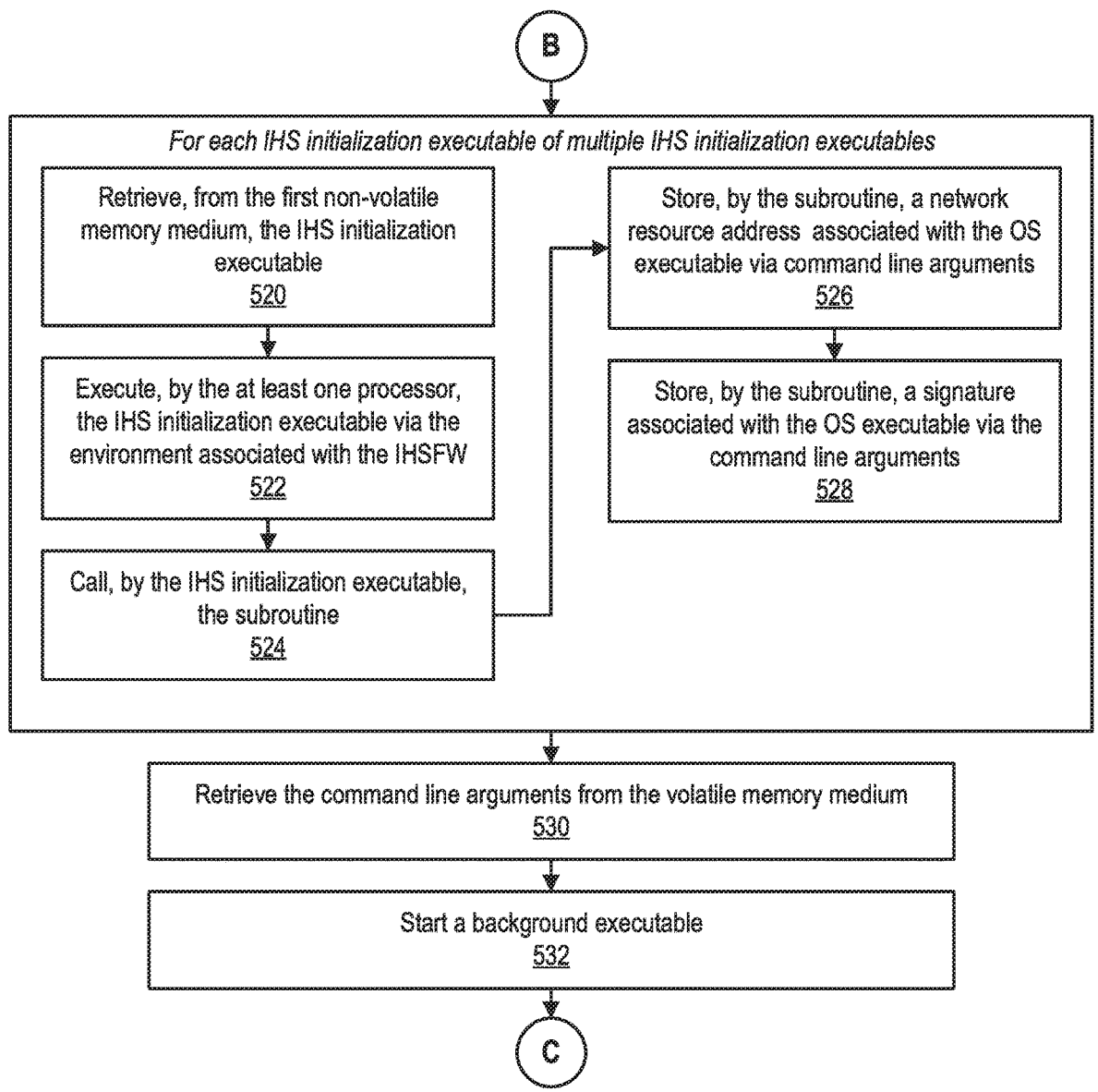
Figure 5C:
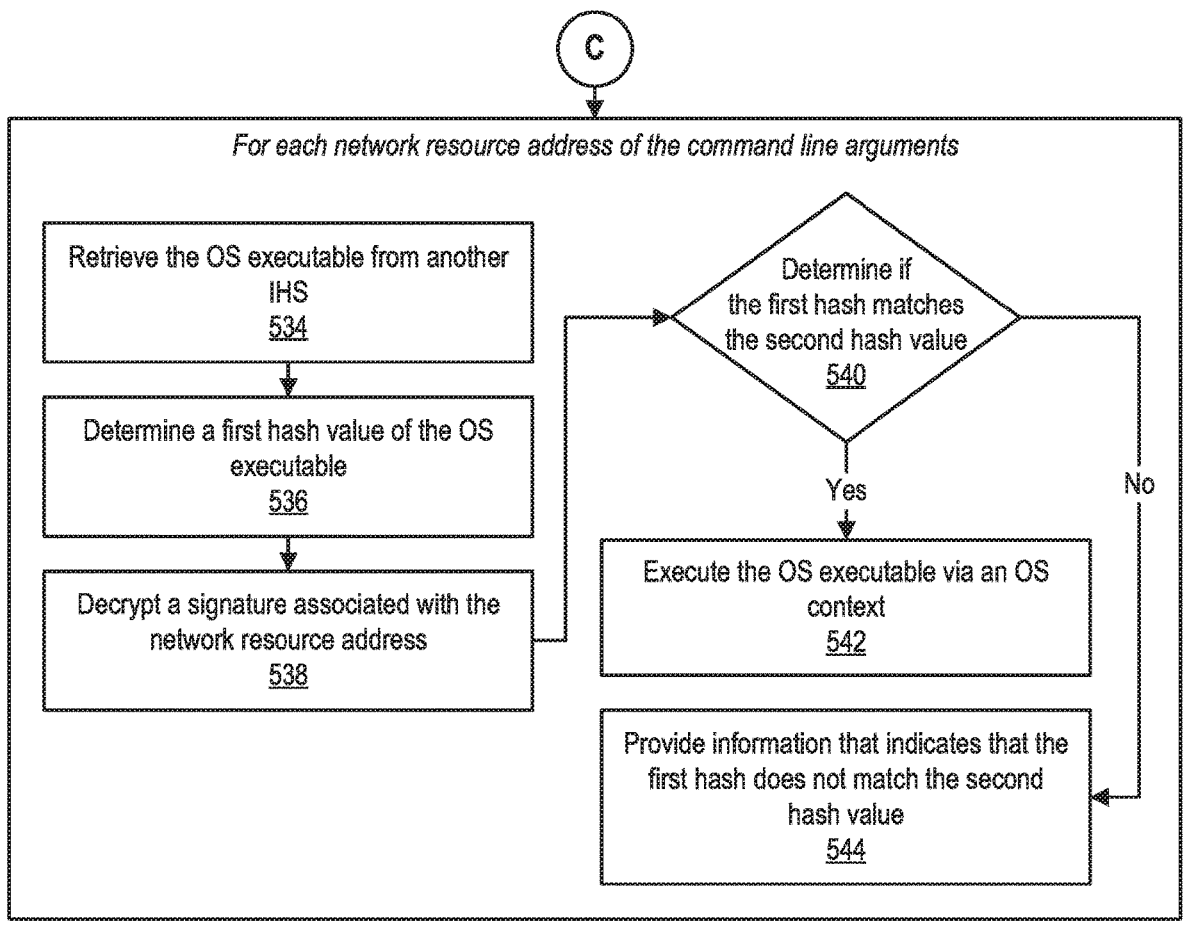

Turning now to FIGS. 5A-5C, another example of a method of operating an information handling system is illustrated, according to one or more embodiments. At 510, at least one processor of an IHS may execute at least a portion of IHSFW from a first non-volatile memory medium of the IHS. For example, processor 120 may execute at least a portion of IHSFW 172 from non-volatile memory medium 170. For instance, the least the portion of IHSFW 172 may include DXE 330. At 512, a first IHS initialization executable associated with a first OS executable may be retrieved from the first non-volatile memory medium. For example, IHS initialization executable 173A may be retrieved from non-volatile memory medium 170. For instance, processor 120 may retrieve executable 173A from non-volatile memory medium 170. In one or more embodiments, DXE 330 may retrieve executable 173A from non-volatile memory medium 170.

At 514, the at least one processor may execute the first IHS initialization executable via an environment associated with the IHSFW. For example, processor 120 may execute IHS initialization executable 173A via an environment associated with IHSFW 172. For instance, the environment associated with IHSFW 172 may include DXE 330. At 516, the first IHS initialization executable may register a subroutine configured to store multiple network resource addresses respectively associated with multiple OS executables. For example, IHS initialization executable 173A may register subroutine 175. For instance, subroutine 175 may be configured to store network resource addresses 190B-190N respectively associated with multiple OS executables 174B-174N.

At 518, the first IHS initialization executable may copy the first OS executable from the first non-volatile memory medium to the volatile memory medium. For example, IHS initialization executable 173A may copy OS executable 174A from non-volatile memory medium 170 to volatile memory medium 150. In one or more embodiments, copying the first OS executable from the first non-volatile memory medium to the volatile memory medium may include retrieving the first OS executable from the volatile memory medium. For example, IHS initialization executable 173A may retrieve OS executable 174A from non-volatile memory medium 170. In one or more embodiments, copying the first OS executable from the first non-volatile memory medium to the volatile memory medium may include writing the first OS executable to the volatile memory medium. For example, IHS initialization executable 173A may write OS executable 174A to volatile memory medium 150.

In one or more embodiments, method elements 520-528 may be performed for each IHS initialization executable of multiple IHS initialization executables. For example, method elements 520-528 may be performed for each IHS initialization executable of multiple IHS initialization executables 173B-173N. At 520, the IHS initialization executable of the multiple IHS initialization executables may be retrieved from the first non-volatile memory medium. For example, an IHS initialization executable 173 of IHS initialization executables 173B-173N may be retrieved from non-volatile memory medium 170. In one instance, IHS initialization executable 173B of IHS initialization executable 173B may be retrieved from non-volatile memory medium 170. In another instance, IHS initialization executable 173C may be retrieved from non-volatile memory medium 170.

At 522, the at least one processor may execute the IHS initialization executable via the environment associated with the IHSFW. For example, processor 120 may execute IHS initialization executable 173 of IHS initialization executables 173B-173N via the environment associated with IHSFW 172. In one instance, processor 120 may execute IHS initialization executable 173B via the environment associated with IHSFW 172. In another instance, processor 120 may execute IHS initialization executable 173C via the environment associated with IHSFW 172. In one or more embodiments, the environment associated with IHSFW 172 may include DXE 330.

At 524, the IHS initialization executable may call the subroutine. In one or more embodiments, IHS initialization executable 173 of IHS initialization executables 173B-173N may call subroutine 175. In one example, IHS initialization executable 173B may call subroutine 175. For instance, IHS initialization executable 173B may pass NRA 190B and/or signature 191B to subroutine 175. In another example, IHS initialization executable 173C may call subroutine 175. For instance, IHS initialization executable 173C may pass NRA 190C and/or signature 191C to subroutine 175.

At 526, the subroutine may store a network resource address associated with an OS executable via command line arguments. For example, subroutine 175 may store a network resource address 190 associated with OS executable 174 of OS executables 174B-174N via command line arguments 192. In one instance, subroutine 175 may store NRA 190B associated with OS executable 174B via command line arguments 192. In another instance, subroutine 175 may store NRA 190C associated with OS executable 174C via command line arguments 192.

At 528, the subroutine may store a signature associated with an OS executable via command line arguments. For example, subroutine 175 may store a signature 191 associated with OS executable 174 of OS executables 174B-174N via command line arguments 192. In one instance, subroutine 175 may store signature 191B associated with OS executable 174B via command line arguments 192. In another instance, subroutine 175 may store signature 191B associated with OS executable 174C via command line arguments 192. At 530, the first OS executable may retrieve the command line arguments from the volatile memory medium. For example, OS executable 174A may retrieve command line arguments 192 from volatile memory medium 150. For instance, OS executable 174A may retrieve command line arguments 192 from data structure 176A.

At 532, the first OS executable may start a background executable. For example, OS executable 174A may start background executable 322. In one or more embodiments, the first OS executable may pass the command line arguments to the background executable. For example, OS executable 174A may pass command line arguments 192 to background executable 322. In one or more embodiments, the first OS executable may pass the command line arguments to an operating system service manager, which may pass the command line arguments to the background executable. For example, OS executable 174A may pass command line arguments 192 to an operating system service manager, which may pass the command line arguments to background executable 322. In one instance, an operating system service manager may include a service control manager for a MICROSOFT® WINDOWS® OS. In a second instance, an operating system service manager may include a launchd for a MACOS®. In another instance, an operating system service manager may include a systemd for a LINUX® OS. In one or more embodiments, starting the background executable may include the first OS executable providing an identification associated with the background executable to the operating system service manager. In one example, the identification associated with the background executable may include a filename associated with the background executable. In another example, the identification associated with the background executable may include a path (e.g., a path in a file system) and a filename.

In one or more embodiments, method elements 534-544 may be performed for each network resource address of the command line arguments. For example, method elements 534-544 may be performed for each network resource address 190 of command line arguments 192. At 534, the OS executable associated with the network resource address may be retrieved from another information handling system based at least on the network resource address. In one example, background executable 322 may retrieve OS executable 174 of OS executable 174B-174N from an IHS 110 of IHSs 110B-110N based at least on network resource address 190. For instance, background executable 322 may retrieve OS executable 174 of OS executable 174B-174N from an IHS 110 of IHSs 110B-110N based at least on network resource address 190 via network 140. As an example, background executable 322 may retrieve OS executable 174B from an IHS 110 of IHSs 110B-110N based at least on network resource address 190B via network 140. As another example, background executable 322 may retrieve OS executable 174C from an IHS 110 of IHSs 110B-110N based at least on network resource address 190C via network 140. In another example, background executable 322 may retrieve OS executable 174 of OS executable 174B-174N from BMC 130 based at least on network resource address 190. For instance, background executable 322 may retrieve OS executable 174 of OS executable 174B-174N from BMC 130 based at least on network resource address 190 via network 140.

In one or more embodiments, retrieving an OS executable from another information handling system based at least on the network resource address may include IHS 110A retrieving the OS executable from an IHS 110 of IHSs 110B-110N. In one or more embodiments, retrieving an OS executable from another information handling system based at least on the network resource address may include IHS 110A retrieving the OS executable from BMC 130 of IHS 110A. In one or more embodiments, retrieving an OS executable from another information handling system based at least on the network resource address may include downloading the OS executable from the other information handling system based at least on the network resource address. In one or more embodiments, retrieving an OS executable from another information handling system based at least on the network resource address may include downloading the OS executable from the BMC based at least on the network resource address. For example, retrieving an OS executable 174 from another information handling system based at least on NRA 190 may include downloading OS executable 174 from BMC 130 based at least on NRA 190.

At 536, a first hash value of the OS executable may be determined. For example, the first hash value of the OS executable may be determined via a one-way hash function. For instance, a hash value of OS executable 174 may be determined via a one-way hash function. As one example, background executable 322 may determine the first hash value of OS executable 174B via the one-way hash function. As another example, background executable 322 may determine the first hash value of OS executable 174C via the one-way hash function.

At 538, a signature associated with the network resource address may be decrypted, via an asymmetric encryption process and a public encryption key, to obtain a second hash value. For example, signature 191 associated with network resource address 190 may be decrypted, via an asymmetric encryption process and a public encryption key, to obtain a second hash value. For instance, the public encryption key may be associated with a private encryption key. In one or more embodiments, the private encryption key may be different from the public encryption key. For example, the private encryption key and the public encryption key may be asymmetric encryption keys. In one instance, data encrypted via the private encryption key may be decrypted via the public encryption key to obtain the data. In another instance, data encrypted via the public encryption key may be decrypted via the private encryption key to obtain the data. In one or more embodiments, signature 191 associated with network resource address 190 may include encrypted data of a hash value of OS executable 174. For example, a hash value of OS executable 174, determined via the one-way hash function, may have been encrypted, via the asymmetric encryption process, with the private encryption key to produce signature 191.

At 540, it may be determined if the first hash matches the second hash value. If the first hash matches the second hash value, the OS executable may be executed via an OS context, at 542. For example, if the first hash matches the second hash value, OS executable 174 may be executed via an OS context. For example, processor 120 may execute OS executable 174 via OS environment 340. In one or more embodiments, the OS environment may include an OS context. For example, the OS context may include access of file system 360, access to one or more libraries of OS 162, and/or access of one or more subroutines provided by OS 162, among others. In one or more embodiments, if the first hash matches the second hash value, OS executable 174 may be stored via non-volatile memory medium 160.

If the first hash does not match the second hash value, information that indicates that the first hash does not match the second hash value may be provided, at 544. For example, if the first hash does not match the second hash value, information that indicates that OS executable 174 is not valid may be provided. In one instance, if the first hash does not match the second hash value, information that indicates that OS executable 174 will not be executed may be provided. In one instance, if the first hash does not match the second hash value, information that indicates that an error or an issue associated with OS executable 174 may be provided. In one or more embodiments, if the first hash does not match the second hash value, OS executable 174 may not be stored via non-volatile memory medium 160.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system (IHS) to:
     execute, by the at least one processor, at least a portion of IHS firmware (IHSFW) from a first non-volatile memory medium of the IHS;
     retrieve, from the first non-volatile memory medium, a first IHS initialization executable associated with a first operating system (OS) executable;
     execute, by the at least one processor, the first IHS initialization executable via an environment associated with the IHSFW;
     register, by the first IHS initialization executable, a subroutine configured to store a plurality of network resource addresses respectively associated with a plurality of OS executables;
     copy, by the first IHS initialization executable, the first OS executable from the first non-volatile memory medium to a volatile memory medium of the IHS;
     execute, by the at least one processor, the first OS executable via an OS environment;
     for each IHS initialization executable of a plurality of IHS initialization executables:
       retrieve the IHS initialization executable from the first non-volatile memory medium;
       execute, by the at least one processor, the IHS initialization executable via the environment associated with the IHSFW;
       call, by the IHS initialization executable, the subroutine; and
       store, by the subroutine, a network resource address of the plurality of network resource addresses associated with an OS executable of the plurality of OS executables via command line arguments, wherein the command line arguments are stored via a data structure in the volatile memory medium;
     retrieve, by the first OS executable, the command line arguments from the volatile memory medium;
     start, by the first OS executable, a background executable; and
     for each network resource address of the command line arguments:
       retrieve, by the background executable, the OS executable associated with the network resource address from another IHS based at least on the network resource address and via a network coupled to the IHS.

2. The information handling system of claim 1, wherein the instructions further cause the information handling system to:
   for each IHS initialization executable of the plurality of IHS initialization executables:
     store, by the subroutine, a signature associated with the OS executable via the command line arguments; and
   for each network resource address of the command line arguments:
     determine a first hash value of the OS executable;
     decrypt the signature associated with the network resource address to obtain a second hash value;
     determine if the first hash value matches the second hash value;
     if the first hash matches the second hash value, execute the OS executable via an OS environment; and
     if the first hash does not match the second hash value, provide information that indicates that the first hash does not match the second hash value.

3. The information handling system of claim 1, wherein the plurality of network resource addresses include a respective plurality of Uniform Resource Locators (URLs).

4. The information handling system of claim 1,
   wherein the environment associated with the IHSFW environment includes a driver execution environment (DXE);
   wherein a first DXE driver include the first IHS initialization executable; and
   wherein a plurality of DXE drivers respectively include the plurality of IHS initialization executables.

5. The information handling system of claim 1, further comprising:
   a baseboard management controller coupled to the at least one processor;
   wherein, to retrieve, by the background executable, the OS executable associated with the network resource address from the other IHS based at least on the network resource address and via the network coupled to the IHS, the instructions further cause the information handling system to retrieve, by the background executable, the OS executable associated with the network resource address from the baseboard management controller.

6. The information handling system of claim 1, wherein the first non-volatile memory medium includes a serial interface flash memory device.

7. The information handling system of claim 1, wherein the data structure includes a table that is compliant with an Advanced Configuration and Power Interface (ACPI) table.

8. A method, comprising:
   executing, by at least one processor of an information handling system (IHS), at least a portion of IHS firmware (IHSFW) from a first non-volatile memory medium of the IHS;
   retrieving, from the first non-volatile memory medium, a first IHS initialization executable associated with a first operating system (OS) executable;
   executing, by the at least one processor, the first IHS initialization executable via an environment associated with the IHSFW;
   registering, by the first IHS initialization executable, a subroutine configured to store a plurality of network resource addresses respectively associated with a plurality of OS executables;
   copying, by the first IHS initialization executable, the first OS executable from the first non-volatile memory medium to a volatile memory medium of the IHS;
   executing, by the at least one processor, the first OS executable via an OS environment;
   for each IHS initialization executable of a plurality of IHS initialization executables:
      retrieving the IHS initialization executable from the first non-volatile memory medium;
      executing, by the at least one processor, the IHS initialization executable via the environment associated with the IHSFW;
      calling, by the IHS initialization executable, the subroutine; and
      storing, by the subroutine, a network resource address of the plurality of network resource addresses associated with an OS executable of the plurality of OS executables via command line arguments, wherein the command line arguments are stored via a data structure in the volatile memory medium;
   retrieving, by the first OS executable, the command line arguments from the volatile memory medium;
   starting, by the first OS executable, a background executable; and
   for each network resource address of the command line arguments:
      retrieving, by the background executable, the OS executable associated with the network resource address from another IHS based at least on the network resource address and via a network coupled to the IHS.

9. The method of claim 8, further comprising:
   for each IHS initialization executable of the plurality of IHS initialization executables:
      storing, by the subroutine, a signature associated with the OS executable via the command line arguments; and
   for each network resource address of the command line arguments:
      determining a first hash value of the OS executable;
      decrypting the signature associated with the network resource address to obtain a second hash value;
      determining if the first hash value matches the second hash value;
      if the first hash matches the second hash value, executing the OS executable via the OS environment; and
      if the first hash does not match the second hash value, providing information that indicates that the first hash does not match the second hash value.

10. The method of claim 8, wherein the plurality of network resource addresses include a respective plurality of Uniform Resource Locators (URLs).

11. The method of claim 8,
   wherein the environment associated with the IHSFW environment includes a driver execution environment (DXE);
   wherein a first DXE driver include the first IHS initialization executable; and
   wherein a plurality of DXE drivers respectively include the plurality of IHS initialization executables.

12. The method of claim 8,
   wherein the IHS includes a baseboard management controller coupled to the at least one processor; and
   wherein the retrieving, by the background executable, the OS executable associated with the network resource address from the other IHS based at least on the network resource address and via the network coupled to the IHS includes retrieving, by the background executable, the OS executable associated with the network resource address from the baseboard management controller.

13. The method of claim 8, wherein the first non-volatile memory medium includes a serial interface flash memory device.

14. The method of claim 8, wherein the data structure includes a table that is compliant with an Advanced Configuration and Power Interface (ACPI) table.

15. A computer-readable non-transitory memory medium that includes instructions that, when executed by at least one processor of an information handling system, cause the information handling system (IHS) to:
   execute, by the at least one processor, at least a portion of IHS firmware (IHSFW) from a first non-volatile memory medium of the IHS;
   retrieve, from the first non-volatile memory medium, a first IHS initialization executable associated with a first operating system (OS) executable;
   execute, by the at least one processor, the first IHS initialization executable via an environment associated with the IHSFW;
   register, by the first IHS initialization executable, a subroutine configured to store a plurality of network resource addresses respectively associated with a plurality of OS executables;
   copy, by the first IHS initialization executable, the first OS executable from the first non-volatile memory medium to a volatile memory medium of the IHS;
   execute, by the at least one processor, the first OS executable via an OS environment;
   for each IHS initialization executable of a plurality of IHS initialization executables:
      retrieve the IHS initialization executable from the first non-volatile memory medium;
      execute, by the at least one processor, the IHS initialization executable via the environment associated with the IHSFW;
      call, by the IHS initialization executable, the subroutine; and
      store, by the subroutine, a network resource address of the plurality of network resource addresses associated with an OS executable of the plurality of OS executables via command line arguments, wherein the command line arguments are stored via a data structure in the volatile memory medium;
   retrieve, by the first OS executable, the command line arguments from the volatile memory medium;

start, by the first OS executable, a background executable; and for each network resource address of the command line arguments:

retrieve, by the background executable, the OS executable associated with the network resource address from another IHS based at least on the network resource address and via a network coupled to the IHS.

16. The computer-readable non-transitory memory medium of claim 15, wherein the instructions further cause the information handling system to:

for each IHS initialization executable of the plurality of IHS initialization executables:

store, by the subroutine, a signature associated with the OS executable via the command line arguments; and for each network resource address of the command line arguments:

determine a first hash value of the OS executable;

decrypt the signature associated with the network resource address to obtain a second hash value;

determine if the first hash value matches the second hash value;

if the first hash matches the second hash value, execute the OS executable via the OS environment; and if the first hash does not match the second hash value, provide information that indicates that the first hash does not match the second hash value.

17. The computer-readable non-transitory memory medium of claim 15, wherein the plurality of network resource addresses include a respective plurality of Uniform Resource Locators (URLs).

18. The computer-readable non-transitory memory medium of claim 15, wherein the environment associated with the IHSFW environment includes a driver execution environment (DXE);

wherein a first DXE driver include the first IHS initialization executable; and wherein a plurality of DXE drivers respectively include the plurality of IHS initialization executables.

19. The computer-readable non-transitory memory medium of claim 15, wherein the IHS includes a baseboard management controller coupled to the at least one processor; and wherein, to retrieve, by the background executable, the OS executable associated with the network resource address from the other IHS based at least on the network resource address and via the network coupled to the IHS, the instructions further cause the information handling system to retrieve, by the background executable, the OS executable associated with the network resource address from the baseboard management controller.

20. The computer-readable non-transitory memory medium of claim 15, wherein the data structure includes a table that is compliant with an Advanced Configuration and Power Interface (ACPI) table.

\* \* \* \* \*